US012671087B2

(12) United States Patent
Nagao et al.

(10) Patent No.: US 12,671,087 B2
(45) Date of Patent: Jun. 30, 2026

(54) LITHIUM METAL COMPOSITE OXIDE, POSITIVE ELECTRODE ACTIVE MATERIAL FOR LITHIUM SECONDARY BATTERY, POSITIVE ELECTRODE FOR LITHIUM SECONDARY BATTERY, AND LITHIUM SECONDARY BATTERY

(71) Applicant: SUMITOMO METAL MINING CO., LTD., Tokyo (JP)

(72) Inventors: Daisuke Nagao, Ehime (JP); Kenji Takamori, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 563 days.

(21) Appl. No.: 18/259,511

(22) PCT Filed: Jan. 31, 2022

(86) PCT No.: PCT/JP2022/003558
§ 371 (c)(1),
(2) Date: Jun. 27, 2023

(87) PCT Pub. No.: WO2022/168780
PCT Pub. Date: Aug. 11, 2022

(65) Prior Publication Data
US 2024/0063383 A1 Feb. 22, 2024

(30) Foreign Application Priority Data
Feb. 3, 2021 (JP) ................................. 2021-015685

(51) Int. Cl.
*H01M 4/525* (2010.01)
*H01M 4/02* (2006.01)
*H01M 10/052* (2010.01)

(52) U.S. Cl.
CPC ......... *H01M 4/525* (2013.01); *H01M 10/052* (2013.01); *H01M 2004/021* (2013.01); *H01M 2004/028* (2013.01)

(58) Field of Classification Search
CPC ............................ H01M 4/525; H01M 10/052
See application file for complete search history.

(56) References Cited

U.S. PATENT DOCUMENTS

| | | | | |
|---|---|---|---|---|
| 2005/0271944 A1* | 12/2005 | Suhara | .................. | H01M 4/485 |
| | | | | 429/231.95 |
| 2007/0248883 A1 | 10/2007 | Oda et al. | | |

(Continued)

FOREIGN PATENT DOCUMENTS

| | | |
|---|---|---|
| JP | 2004-335152 A | 11/2004 |
| JP | 2007-257985 A | 10/2007 |

(Continued)

OTHER PUBLICATIONS

International Search Report issued in corresponding International Patent Application No. PCT/JP2022/003558 dated Apr. 5, 2022, with English translation.

(Continued)

*Primary Examiner* — Ula C Ruddock
*Assistant Examiner* — Olivia Mason Ruggiero
(74) *Attorney, Agent, or Firm* — Foley & Lardner LLP

(57) ABSTRACT

An object of the present invention is to provide a lithium metal composite oxide, when used as a positive electrode active material for a lithium secondary battery, capable of obtaining a lithium secondary battery having a high cycle retention rate, and a positive electrode active material for a lithium secondary battery, a positive electrode for a lithium secondary battery, and a lithium secondary battery in which the lithium metal composite oxide is used. This lithium metal composite oxide is a particulate lithium metal com- (Continued)

posite oxide, comprising first particles having a particle diameter equal to or less than a 50% cumulative volume particle size $D_{50}$ of the lithium metal composite oxide and second particles having a particle diameter exceeding the $D_{50}$, in which the $D_{50}$ is 2 to 20 μm, an average particle strength $P_S$ of the first particles is larger than an average particle strength $P_B$ of the second particles, and a standard deviation $\sigma_S$ of the particle strength of the first particles is larger than a standard deviation $\sigma_B$ of the particle strength of the second particles.

13 Claims, 3 Drawing Sheets

(56) References Cited

U.S. PATENT DOCUMENTS

| | | | | |
|---|---|---|---|---|
| 2018/0241036 A1* | 8/2018 | Jo | .......................... | C01G 53/50 |
| 2019/0270650 A1 | 9/2019 | Imanari et al. | | |

| | | | | |
|---|---|---|---|---|
| 2021/0028453 A1 | 1/2021 | Imanari et al. | | |
| 2023/0047021 A1 | 2/2023 | Yamamoto et al. | | |
| 2023/0073433 A1* | 3/2023 | Lee | ....................... | H01M 4/485 |

FOREIGN PATENT DOCUMENTS

| | | |
|---|---|---|
| JP | 2015-222696 A | 12/2015 |
| WO | 2005/020354 A1 | 3/2005 |
| WO | 2021/153397 A1 | 8/2021 |

OTHER PUBLICATIONS

Office Action issued in corresponding Japanese Patent Application No. 2021-015685 dated Apr. 5, 2022, with English translation.

Translation of the International Preliminary Report on Patentability and the Written Opinion of the International Search Authority issued in corresponding International Patent Application No. PCT/JP2022/003558, dated Aug. 17, 2023.

* cited by examiner

LITHIUM METAL COMPOSITE OXIDE, POSITIVE ELECTRODE ACTIVE MATERIAL FOR LITHIUM SECONDARY BATTERY, POSITIVE ELECTRODE FOR LITHIUM SECONDARY BATTERY, AND LITHIUM SECONDARY BATTERY

CROSS REFERENCE TO RELATED APPLICATIONS

This application is the U.S. National Phase under 35 U.S.C. § 371 of International Application No. PCT/JP2022/003558, filed on Jan. 31, 2022, which claims the benefit of Japanese Application No. 2021-015685, filed on Feb. 3, 2021, the entire contents of each are hereby incorporated by reference.

TECHNICAL FIELD

The present invention relates to a lithium metal composite oxide, a positive electrode active material for a lithium secondary battery, a positive electrode for a lithium secondary battery, and a lithium secondary battery.

BACKGROUND ART

A lithium secondary battery has a positive electrode for a lithium secondary battery containing a positive electrode active material. As the positive electrode active material, a lithium metal composite oxide is used.

A lithium metal composite oxide contains a secondary particle, which is an aggregate of primary particles. As a desorption and insertion reaction of lithium ions occurs on the surface of the lithium metal composite oxide, characteristics of the lithium metal composite oxide affects various capabilities of lithium secondary batteries. Therefore, for the purpose of improving capabilities of lithium secondary batteries, controlling various characteristics of lithium metal composite oxides has been actively conducted.

For example, attempts have been conducted to control the pore distribution or specific surface area of lithium metal composite oxides. Patent Document 1 discloses a positive electrode active material for a non-aqueous electrolyte secondary battery in which the average volume of pores having a diameter of 40 nm or less on average is 0.001 to 0.008 $cm^3/g$ in pore distribution measurement by a nitrogen adsorption method.

In addition, attempts have been conducted to control the strength of lithium metal composite oxides. Patent Document 2 discloses that a positive electrode active material for a lithium secondary battery is made of secondary particles and the average crushing strength of the secondary particles is 110 MPa or less.

CITATION LIST

Patent Document

Patent Document 1: JP-A-2007-257985
Patent Document 2: JP-A-2004-335152

SUMMARY OF INVENTION

Technical Problem

When a lithium metal composite oxide is used as the positive electrode active material of a lithium secondary battery, particles having a small particle diameter can crack in an electrode pressing step thereby to generate voids in the layer containing the positive electrode active material. Consequently, a contact failure between the positive electrode and the layer containing the positive electrode active material can occur thereby to lead to a decrease in the cycle characteristics of the lithium secondary battery. From this viewpoint, enhancing the characteristics of lithium metal composite oxides have not been conducted so far.

The present invention has been made in view of the above-described circumstances, and an object of the present invention is to provide a lithium metal composite oxide, when used as a positive electrode active material for a lithium secondary battery, capable of obtaining a lithium secondary battery having a high cycle retention rate, and a positive electrode active material for a lithium secondary battery, a positive electrode for a lithium secondary battery, and a lithium secondary battery in which the lithium metal composite oxide is used.

Solution to Problem

The present invention has the following aspects.

[1] A lithium metal composite oxide of particle shape, comprising first particles having a particle diameter equal to or less than a 50% cumulative volume particle size $D_{50}$ of the lithium metal composite oxide and second particles having a particle diameter exceeding the $D_{50}$, in which the $D_{50}$ is 2 to 20 μm, an average particle strength $P_S$ of the first particles is larger than an average particle strength $P_B$ of the second particles, and a standard deviation $\sigma_S$ of the particle strength of the first particles is larger than a standard deviation $\sigma_B$ of the particle strength of the second particles.

[2] The lithium metal composite oxide according to [1], in which $P_S-P_B$, which is a difference between the $P_S$ and the $P_B$, is 15 MPa or more.

[3] The lithium metal composite oxide according to [1] or [2], in which $\sigma_S-\sigma_B$, which is a difference between the $\sigma_S$ and the $\sigma_B$, is 5 MPa or more.

[4] The lithium metal composite oxide according to any one of [1] to [3], in which the $P_S$ is 50 to 110 MPa.

[5] The lithium metal composite oxide according to any one of [1] to [4], in which the $P_B$ is 20 to 60 MPa.

[6] The lithium metal composite oxide according to any one of [1] to [5], in which the $\sigma_S$ is 20 to 90 MPa.

[7] The lithium metal composite oxide according to any one of [1] to [6], in which the $\sigma_B$ is 10 to 30 MPa.

[8] The lithium metal composite oxide according to any one of [1] to [7], in which a BET specific surface area is 0.1 to 2.0 $m^2/g$.

[9] The lithium metal composite oxide according to any one of [1] to [8], in which the lithium metal composite oxide is represented by a composition formula (I)

$$Li[Li_x(Ni_{(1-y-z)}Co_yX_z)_{1-x}]O_2 \tag{I}$$

and in the formula (I), X represents one or more elements selected from the group consisting of Mn, Fe, Cu, Ti, Mg, Al, W, Mo, Nb, Zn, Sn, Zr, Ga, B, Si, S, and P, and $-0.1 \le x \le 0.2$, $0 \le y \le 0.4$, and $0 < z \le 0.5$ are satisfied.

[10] The lithium metal composite oxide according to [9], in which the composition formula (I) satisfies $0 < y+z \le 0.3$.

[11] A positive electrode active material for a lithium secondary battery, containing: the lithium metal composite oxide according to any one of [1] to [10].

[12] A positive electrode for a lithium secondary battery, containing: the positive electrode active material for the lithium secondary battery according to [11].

[13] A lithium secondary battery, containing: the positive electrode for the lithium secondary battery according to [12].

Advantageous Effects of Invention

According to the present invention, it is possible to provide a lithium metal composite oxide, when used as a positive electrode active material for a lithium secondary battery, capable of obtaining a lithium secondary battery having a high cycle retention rate, and a positive electrode active material for a lithium secondary battery, a positive electrode for a lithium secondary battery, and a lithium secondary battery in which the lithium metal composite oxide is used.

DESCRIPTION OF EMBODIMENTS

Figure 1:
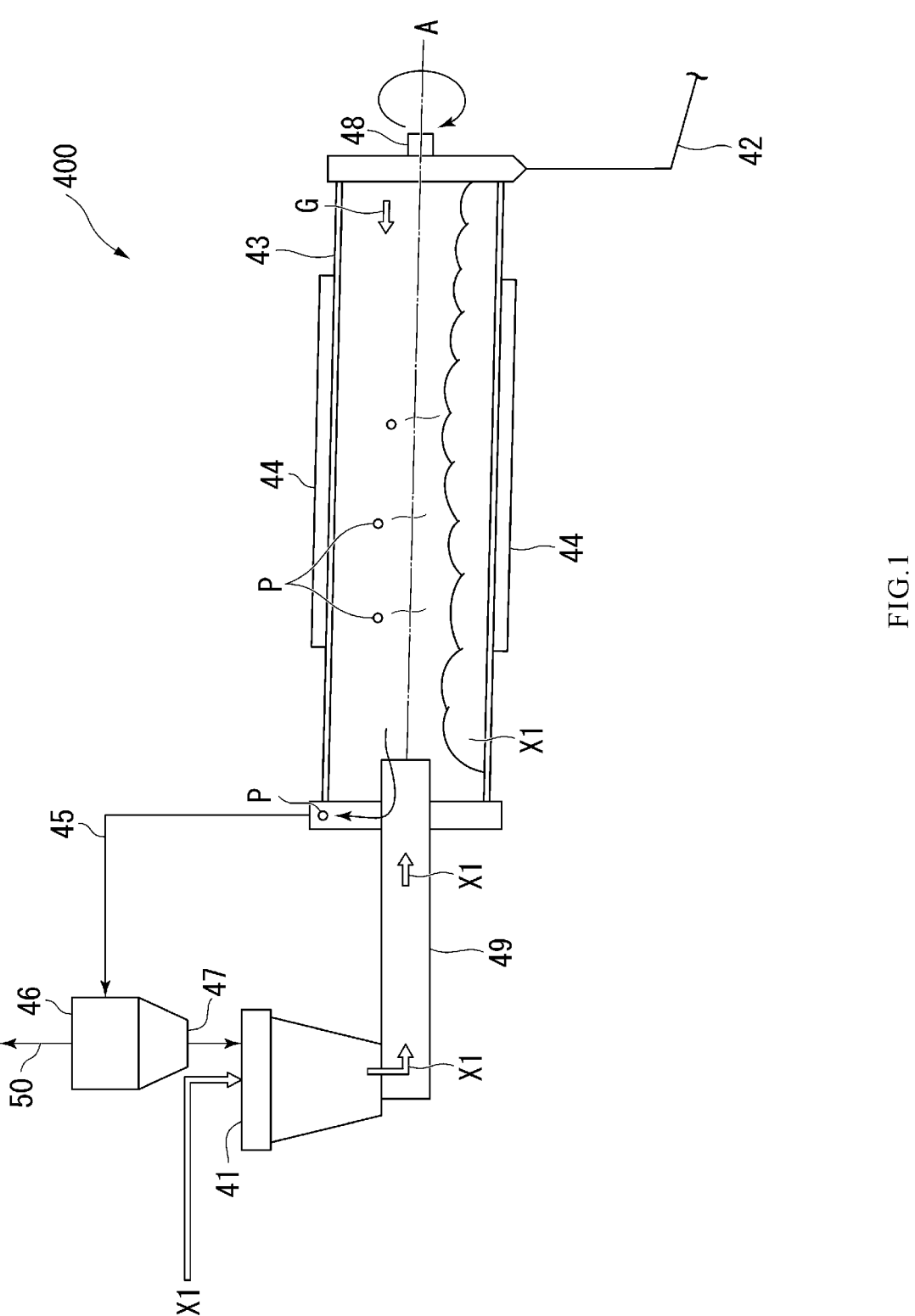
FIG. 1 is a schematic view describing a production method of a lithium metal composite oxide in one aspect of the present embodiment.

Hereinafter, a lithium metal composite oxide in an aspect of the present invention will be described. In a plurality of embodiments to be described below, preferable examples or conditions may be shared. In the present specification, terms are each defined below.

In the present specification, a metal composite compound will be hereinafter referred to as "MCC", a lithium metal composite oxide will be hereinafter referred to as "LiMO", and a positive electrode (cathode) active material for a lithium secondary battery will be hereinafter referred to as "CAM".

"Ni" refers not to a nickel metal but to a nickel atom. "Co", "Li", and the like also, similarly, each refer to a cobalt atom, a lithium atom, or the like.

In a case where a numerical range is expressed as, for example, "1 to 10 µm", this means a range from 1 µm to 10 µm and means a numerical range including 1 µm, which is the lower limit value, and 10 m, which is the upper limit value.

"BET specific surface area" is a value that is measured by the Brunauer, Emmet, and Teller (BET) method. Nitrogen gas is used as the adsorbed gas in the measurement of the BET specific surface area. For example, the BET specific surface area (unit: m²/g) can be measured using a BET specific surface area meter (for example, Macsorb (registered trademark) manufactured by Mountech Co., Ltd.) after drying 1 g of a powder to be measured in a nitrogen atmosphere at 105° C. for 30 minutes.

<Measuring Method of Cumulative Particle Size Distribution>

"Cumulative volume particle size" is a value measured by the laser diffraction scattering method. Specifically, an object to be measured, for example, 0.1 g of a LiMO powder is injected into 50 ml of a 0.2 mass % sodium hexametaphosphate aqueous solution to obtain a dispersion liquid in which the powder is dispersed. Next, the particle size distribution of the obtained dispersion liquid is measured using a laser diffraction scattering particle size distribution measuring device (for example, Microtrac MT3300EXII manufactured by MicrotracBEL Corp.) to obtain a volume-based cumulative particle size distribution curve. In the obtained cumulative particle size distribution curve, the value of the particle diameter at the time of 50% cumulation from the fine particle side is the 50% cumulative volume particle size (hereinafter, may be referred to as $D_{50}$) (µm).

The composition of LiMO will be analyzed by the following method. For example, the analysis can be conducted using an inductively coupled plasma emission spectrometer (for example, SPS3000 manufactured by Seiko Instruments Inc.) after LiMO is dissolved in hydrochloric acid.

"Cycle retention rate" means a ratio of the discharge capacity of a lithium secondary battery that has been charged and discharged repeatedly to the initial discharge capacity of the lithium secondary battery after conducting a cycle test in which the lithium secondary battery is charged and discharged repeatedly a predetermined number of times under specific conditions.

In the present specification, a value measured after carrying out a test is regarded as the cycle retention rate, and, in the test, a charging and discharging cycle is repeated 50 times under conditions to be described below.

<Cycle Test>

Test temperature: 25° C.

Maximum charging voltage: 4.3 V, charging current: 0.5 CA, constant current constant voltage charging Minimum discharging voltage: 2.5 V, discharging current: 1 CA, constant current discharging The discharge capacity in the first cycle is regarded as the cycle initial capacity, a value obtained by dividing the discharge capacity in the $50^{th}$ cycle by the cycle initial capacity is calculated, and this value is regarded as the cycle retention rate (%).

<Lithium Metal Composite Oxide>

LiMO of the present embodiment is particulate LiMO, and comprises first particles having a particle diameter equal to or less than $D_{50}$ of the LiMO and second particles having a particle diameter exceeding the $D_{50}$, in which the $D_{50}$ is 2 to 20 µm, the average particle strength $P_S$ of the first particles is larger than the average particle strength $P_B$ of the second particles, the standard deviation $\sigma_S$ of the particle strength of the first particles is larger than the standard deviation $\sigma_B$ of the particle strength of the second particles.

LiMO in the present embodiment is an assembly of a plurality of particles. In other words, LiMO in the present embodiment is powdery. In the present embodiment, the assembly of a plurality of particles may contain only primary particles, may contain only secondary particles, or may be a mixture of primary particles and secondary particles.

In the present embodiment, "primary particle" means a particle in which, apparently, no grain boundary is present at the time of observing the particle in a visual field of 5000 times or more and 20000 times or less using a scanning electron microscope or the like.

In the present embodiment, "secondary particle" is a particle in which the primary particles aggregate. That is, a secondary particle is an aggregate of primary particles.

"Particle diameter" in the present specification is the particle diameter of the secondary particles that are contained in LiMO or the particle diameter of the primary particles that are present independently of the secondary particles.

The $D_{50}$ of LiMO of the present embodiment is 2 to 20 μm, preferably 3 to 18 μm, more preferably 4 to 16 μm, and still more preferably 5 to 15 μm. When the $D_{50}$ of LiMO is 2 to 20 μm, the bulk density of LiMO can be larger. When such LiMO is used as CAM, the filling density of LiMO increases. Therefore, an increase in the contact area of LiMO and conductive particles contained in the positive electrode leads to an improvement in the conductivity. Thus, the direct current resistance of the lithium secondary battery can be reduced, and the cycle retention rate of the lithium secondary battery can be improved.

In LiMO of the present embodiment, the average particle strength $P_S$ of the first particles having a particle diameter equal to or less than $D_{50}$ (hereinafter, may be referred to as first particles) is higher than the average particle strength $P_B$ of the second particles having a particle diameter exceeding $D_{50}$ (hereinafter, may be referred to as second particles), and the standard deviation $\sigma_S$ of the particle strength of the first particles is higher than the standard deviation $\sigma_B$ of the particle strength of the second particles.

Hereinafter, the average particle strength $P_S$, average particle strength $P_B$, standard deviation $\sigma_S$, and standard deviation $\sigma_B$ may be referred to as "$P_S$", "$P_B$", "$\sigma_S$", and "$\sigma_B$", respectively.

In a case where an electrode in which LiMO is used as CAM (that is, positive electrode) is produced, press processing is usually conducted in order to form a layer containing CAM at a high density. A production step of conducting such pressing is hereinafter referred to as "electrode pressing step".

When LiMO satisfying the relationship of the above-described $P_S$, $P_B$, $\sigma_S$, and $\sigma_B$ is used as CAM, the first particles are unlikely to crack in the electrode pressing step. Therefore, voids ascribed to particle cracking are unlikely to occur, the density of a positive electrode to be obtained is improved, and a favorable contact state between CAM containing LiMO and a conductive material can be achieved. As a result, it is possible to improve the cycle retention rate of the lithium secondary battery.

$P_S$ is preferably 50 to 110 MPa, more preferably 53 to 105 MPa, and still more preferably 60 to 100 MPa. When $P_S$ is 50 to 110 MPa, the first particles are more unlikely to crack in the electrode pressing step to be conducted in the process of producing the positive electrode.

$P_B$ is preferably 20 to 60 MPa, more preferably 30 to 55 MPa, and still more preferably 40 to 50 MPa. When $P_B$ is 20 to 60 MPa, the second particles are more unlikely to crack in the electrode pressing step to be conducted in the process of producing the positive electrode. When the lower limit value of $P_B$ is equal to or less than the above-described value, voids ascribed to particle cracking are unlikely to occur, the density of a positive electrode to be obtained is improved, and a favorable contact state between CAM containing LiMO and a conductive material can be achieved. As a result, it is possible to improve the cycle retention rate of the lithium secondary battery. When the upper limit value of $P_B$ is equal to or less than the above-described value, the second particles are subject to particle cracking more preferentially than the first particles, but entry of the first particles into voids ascribed to particle cracking leads to an improvement in the density of a positive electrode to be obtained, and a favorable contact state between CAM containing LiMO and a conductive material can be achieved. As a result, it is possible to improve the cycle retention rate of the lithium secondary battery.

$P_S$–$P_B$, which is the difference between $P_S$ and $P_B$, is preferably 15 MPa or more, more preferably 15 to 75 MPa, still more preferably 17 to 70 MPa, and particularly preferably 21 to 65 MPa. When $P_S$–$P_B$ is 15 to 75 MPa, the first particles are more unlikely to crack in the electrode pressing step to be conducted in the process of producing the positive electrode.

$\sigma_S$ is preferably 20 to 90 MPa, more preferably 25 to 85 MPa, and still more preferably 30 to 85 MPa. When as is 20 to 90 MPa, the first particles are more unlikely to crack in the electrode pressing step to be conducted in the process of producing the positive electrode.

$\sigma_B$ is preferably 10 to 30 MPa, more preferably 13 to 28 MPa, and still more preferably 15 to 25 MPa. When $\sigma_B$ is 10 to 30 MPa, the first particles are more unlikely to crack in the electrode pressing step to be conducted in the process of producing the positive electrode.

$\sigma_S$–$\sigma_B$, which is the difference between $\sigma_S$ and $\sigma_B$, is preferably 5 MPa or more, more preferably 5 to 70 MPa, and still more preferably 7 to 70 MPa. When $\sigma_S$–$\sigma_B$ is 5 to 70 MPa, the first particles are more unlikely to crack in the electrode pressing step to be conducted in the process of producing the positive electrode.

<Measuring Method of Average Particle Strength and Standard Deviation of Particle Strength>

$P_S$, $P_B$, $\sigma_S$, and $\sigma_B$ are measured and calculated as follows in the present specification. First, 100 particles are randomly selected from LiMO. A micro compression tester (for example, MCT-510 manufactured by Shimadzu Corporation) is used to measure the particle diameter and breaking strength of each of the selected particles. Here, the breaking strength Cs can be determined by the following formula (II). In the formula (II), P is a test force (unit: N, when a test pressure is gradually raised, a pressure value at which the amount of displacement is maximized with the test pressure remaining substantially constant), and d is a particle diameter (unit: mm, a value obtained by measuring the diameters in the X direction and the Y direction in an observation image of the micro compression tester and calculating the average value thereof).

$$Cs = 2.8P/\pi d^2 \tag{II}$$

As the particle strength has been normalized to the particle diameter, the particle strength is constant if the particles each have the same components. In contrast, if the particle strength is different among the particles, it can be said that components of each particle are different.

$P_S$ is the average value of the breaking strength of the first particles. $P_B$ is the average value of the breaking strength of the second particles.

$\sigma_S$ is the standard deviation of the breaking strength of the first particles. $\sigma_B$ is the standard deviation of the breaking strength of the second particles.

The BET specific surface area of LiMO is preferably 0.1 to 2.0 m²/g, more preferably 0.5 to 1.8 m²/g, and preferably 1.0 to 1.5 m²/g. When the BET specific surface area of LiMO is 0.1 to 2.0 m²/g, a reaction with an electrolytic solution on the surface of CAM containing LiMO is suppressed. As a result, it is possible to increase the cycle retention rate of the lithium secondary battery.

LiMO is a metal oxide containing at least Li and Ni and is represented by, for example, a composition formula (I).

$$Li[Li_x(Ni_{(1-y-z)}Co_yX_z)_{1-x}]O_2 \tag{I}$$

In the formula (I), X represents one or more elements selected from the group consisting of Mn, Fe, Cu, Ti, Mg, Al, W, Mo, Nb, Zn, Sn, Zr, Ga, B, Si, S, and P, and $-0.1 \leq x \leq 0.2$, $0 \leq y \leq 0.2$, and $0 < z \leq 0.2$ are satisfied.

From the viewpoint of obtaining a lithium secondary battery having a high cycle retention rate, x in the formula (I) is −0.1 or more, more preferably −0.05 or more, and still more preferably more than 0. In addition, from the viewpoint of obtaining a lithium secondary battery having a higher initial coulombic efficiency, x in the formula (I) is 0.2 or less, preferably 0.08 or less, and more preferably 0.06 or less.

The upper limit value and lower limit value of x can be randomly combined together. As the combination, for example, x's of −0.1 to 0.2, more than 0 and 0.2 or less, −0.05 to 0.08, more than 0 and 0.06 or less, and the like are exemplary examples.

From the viewpoint of obtaining a lithium secondary battery having a low battery internal resistance, y in the formula (I) is preferably more than 0, more preferably 0.005 or more, and still more preferably 0.05 or more. y in the formula (I) is 0.4 or less, preferably 0.35 or less, more preferably 0.33 or less, and still more preferably 0.30 or less.

The upper limit value and lower limit value of y can be randomly combined together. The combination is, for example, 0 to 0.4, more than 0 and 0.35 or less, 0.005 to 0.35, 0.05 to 0.30, and the like.

From the viewpoint of obtaining a lithium secondary battery having a high cycle retention rate, z in the formula (I) is preferably 0.01 or more and more preferably 0.02 or more. In addition, z in the formula (I) is 0.5 or less, preferably 0.45 or less, and more preferably 0.40 or less.

The upper limit value and lower limit value of z can be randomly combined together. As the combination, for example, z's of more than 0 and 0.4 or less, 0.01 to 0.45, 0.02 to 0.40, and the like are exemplary examples.

In the formula (I), $0<y+z\le0.3$ is preferably satisfied.

From the viewpoint of obtaining a lithium secondary battery having a high cycle retention rate, X is preferably one or more metals selected from the group consisting of Mn, Fe, Cu, Ti, Mg, Al, W, Mo, Nb, Zn, Sn, Zr, Ga, B, Si, S, and P and more preferably one or more metals selected from the group consisting of Mn, Al, W, B, Nb, and Zr.

The crystal structure of LiMO is a layered structure and more preferably a hexagonal crystal structure or a monoclinic crystal structure.

The hexagonal crystal structure belongs to any one space group selected from the group consisting of P3, $P3_1$, $P3_2$, R3, P-3, R-3, P312, P321, $P3_1$12, $P3_1$21, $P3_2$12, $P3_2$21, R32, P3m1, P31m, P3c1, P31c, R3m, R3c, P-31m, P-31c, P-3m1, P-3c1, R-3m, R-3c, P6, $P6_1$, $P6_5$, $P6_2$, $P6_4$, $P6_3$, P-6, P6/m, $P6_3$/m, P622, $P6_1$22, $P6_5$22, $P6_2$22, $P6_4$22, $P6_3$22, P6mm, P6cc, $P6_3$ cm, $P6_3$mc, P-6m2, P-6c2, P-62m, P-62c, P6/mmm, P6/mcc, $P6_3$/mcm, and $P6_3$/mmc.

In addition, the monoclinic crystal structure belongs to any one space group selected from the group consisting of P2, $P2_1$, C2, Pm, Pc, Cm, Cc, P2/m, $P2_1$/m, C2/m, P2/c, $P2_1$/c, and C2/c.

Among these, in order to obtain a lithium secondary battery having a high discharge capacity, the crystal structure is particularly preferably a hexagonal crystal structure belonging to the space group R-3m or a monoclinic crystal structure belonging to C2/m.

The crystal structure of LiMO can be confirmed by observation using a powder X-ray diffraction measuring instrument (for example, Ultima IV manufactured by Rigaku Corporation).

When LiMO described as above is used as CAM, the first particles are unlikely to crack in the electrode pressing step conducted in the process of producing the positive electrode. Generally, when a stress is applied externally on LiMO in the step of electrode pressing, particle cracking can be prevented by relaxing the stress with internal voids present inside the particles, but smaller particles have less internal voids that relax the stress than larger particles have. Therefore, particles having a smaller particle diameter tend to easily crack. However, as the first particles of LiMO of the present embodiment are unlikely to crack as described above, voids ascribed to particle cracking are unlikely to occur, and the contact between CAM and the positive electrode becomes favorable. Consequently, the cycle characteristics of the lithium secondary battery are improved.

<Production Method of LiMO>

Next, the production method of LiMO will be described. As a first method, for LiMO of the present embodiment, the first particles and the second particles may be produced simultaneously. Hereinafter, the first method will be described.

The production method of LiMO includes production of MCC, mixing of MCC and a lithium compound, preliminary calcining of a mixture of MCC and the lithium compound, and calcining of a reaction product obtained by preliminary calcining.

(1) Production of MCC

MCC may be any of a metal composite hydroxide, a metal composite oxide, and a mixture of these. The metal composite hydroxide and metal composite oxide, as an example, contain Ni, Co, and an element X at a molar ratio represented by the following formula (I') and are represented by the following formula (I'').

$$Ni{:}Co{:}X=(1-y-z){:}y{:}z \tag{I'}$$

$$Ni_{(1-y-z)}Co_yX_zO_\alpha(OH)_{2-\beta} \tag{I''}$$

In the formula (I') and the formula (I''), X represents one or more elements selected from the group consisting of Mn, Fe, Cu, Ti, Mg, Al, W, Mo, Nb, Zn, Sn, Zr, Ga, B, Si, S, and P, and $0\le y\le0.4$ and $0<z\le0.5$ are satisfied. In the formula (I''), $0\le\alpha\le3$, $-0.5\le\beta\le2$, and $\beta-\alpha<2$ are satisfied.

Hereinafter, a production method of MCC containing Ni, Co, and Al will be described as an example. First, a metal composite hydroxide containing Ni, Co, and Al is prepared. Usually, the metal composite hydroxide can be produced by a well-known batch-type co-precipitation method or a continuous co-precipitation method.

Specifically, a nickel salt solution, a cobalt salt solution, an aluminum salt solution, and a complexing agent are reacted by the continuous co-precipitation method described in JP-A-2002-201028, thereby producing a metal composite hydroxide represented by $Ni_{(1-y-z)}Co_yAl_z(OH)_2$.

A nickel salt that is a solute of the nickel salt solution is not particularly limited, and, for example, at least one of nickel sulfate, nickel nitrate, nickel chloride, and nickel acetate can be used.

As a cobalt salt that is a solute of the cobalt salt solution, for example, at least one of cobalt sulfate, cobalt nitrate, cobalt chloride, and cobalt acetate can be used.

As an aluminum salt that is a solute of the aluminum salt solution, for example, at least one of aluminum sulfate, aluminum nitrate, aluminum chloride, and aluminum acetate can be used.

The above-described metal salts are used in ratios corresponding to the composition ratio of $Ni_{(1-y-z)}Co_yAl_z(OH)_2$. That is, the amount of each metal salt is specified so that the mole ratio of Ni, Co, and Al in a mixed solution containing the above-described metal salts corresponds to (1-y-z):y:z in the composition formula (I) of LiMO. In addition, as the solvent, water is used.

The complexing agent is capable of forming a complex with a nickel ion, a cobalt ion, and an aluminum ion in an aqueous solution, and examples thereof include ammonium ion donors, hydrazine, ethylenediaminetetraacetic acid, nitrilotriacetic acid, uracildiacetic acid, and glycine. As the ammonium ion donors, ammonium hydroxide, ammonium sulfate, ammonium chloride, ammonium carbonate, ammonium fluoride, and the like are exemplary examples.

In the production step of the metal composite hydroxide, the complexing agent may or may not be used. In a case where the complexing agent is used, regarding the amount of the complexing agent that is contained in the liquid mixture containing the nickel salt solution, the cobalt salt solution, the aluminum salt solution, and the complexing agent, for example, the mole ratio of the complexing agent to the sum of the mole numbers of the metal salts (a nickel salt, a cobalt salt, and an aluminum salt) is more than 0 and 2.0 or less.

In the co-precipitation method, in order to adjust the pH value of the liquid mixture containing the nickel salt solution, the cobalt salt solution, the aluminum salt solution, and the complexing agent, an alkali metal hydroxide is added to the liquid mixture before the pH of the liquid mixture turns from alkaline into neutral. The alkali metal hydroxide is, for example, sodium hydroxide or potassium hydroxide.

The value of the pH in the present specification is defined as a value measured when the temperature of the liquid mixture is 40° C. The pH of the liquid mixture is measured when the temperature of the liquid mixture sampled from a reaction vessel reaches 40° C. In a case where the sampled liquid mixture is lower than 40° C., the liquid mixture is heated up to 40° C. and the pH is measured. In a case where the sampled liquid mixture exceeds 40° C., the liquid mixture is cooled to 40° C. and the pH is measured.

When the complexing agent in addition to the nickel salt solution, the cobalt salt solution, and the aluminum salt solution is continuously supplied to the reaction vessel, and an alkali metal hydroxide is appropriately added thereto to control the pH within a specific range, Ni, Co, and Al react with one another, and $Ni_{(1-y-z)}Co_yAl_z(OH)_2$ is generated.

At the time of the reaction, the temperature of the reaction vessel is controlled within a range of, for example, 20 to 80° C. and preferably 30 to 70° C.

In addition, at the time of the reaction, the pH value in the reaction vessel is controlled, for example, within a range of 9 to 13.

As the reaction vessel that is used in the continuous co-precipitation method, it is possible to use a reaction vessel in which the formed reaction precipitate is caused to overflow for separation.

In a case where the metal composite hydroxide is produced by the batch-type co-precipitation method, examples of the reaction vessel include a reaction vessel not equipped with an overflow pipe, a device equipped with a concentration tank connected to the overflow pipe and having a mechanism in which and a reaction precipitate that has overflowed is concentrated in a concentration tank and circulated to the reaction vessel again and the like.

A variety of gases, for example, an inert gas such as nitrogen, argon, or carbon dioxide, an oxidizing gas such as an air or oxygen, or a gas mixture thereof may be supplied into the reaction vessel.

When the concentration of the metal salts to be supplied to the reaction vessel, reaction temperature, reaction pH, and the like are appropriately controlled, it is possible to control the values of the $D_{50}$ and BET specific surface area of CAM to be finally obtained within the ranges of the present embodiment.

After the above-described reaction, the neutralized reaction precipitate is isolated. For isolation, for example, a method in which a slurry containing the reaction precipitate (that is, co-precipitate slurry) is dehydrated by centrifugation, suction filtration, or the like is used.

The isolated reaction precipitate is washed, dehydrated, dried, and sieved, and the metal composite hydroxide containing Ni, Co and Al is obtained.

The reaction precipitate is preferably washed with water or an alkaline washing liquid. In the present embodiment, the reaction precipitate is preferably washed with an alkaline washing liquid and more preferably washed with an aqueous solution of sodium hydroxide.

When MCC is a metal composite oxide, the metal composite hydroxide is heated to produce a metal composite oxide. Specifically, the metal composite hydroxide is heated at 400 to 700° C. If necessary, a plurality of heating steps may be carried out. The heating temperature in the present specification means the set temperature of a heating device. In the case of having a plurality of heating steps, the heating temperature means the temperature when the metal composite hydroxide is heated at the highest holding temperature among individual heating step.

The heating temperature is preferably 400 to 700° C. and more preferably 450 to 680° C. When the heating temperature is 400 to 700° C., the metal composite hydroxide is sufficiently oxidized, and a metal composite oxide having a BET specific surface area in an appropriate range can be obtained. When the heating temperature is lower than 400° C., there is a concern that the metal composite hydroxide may not be sufficiently oxidized. When the heating temperature exceeds 700° C., there is a concern that the metal composite hydroxide may be excessively oxidized and the BET specific surface area of the metal composite oxide may become too small. When the heating temperature is appropriately adjusted, it is possible to control $P_S$ and $P_B$ of LiMO within the ranges of the present embodiment. When the heating temperature is set to be high, there is a tendency that $P_S$ and $P_B$ of LiMO increase.

The time for holding at the above-described heating temperature is, for example, 0.1 to 20 hours and preferably 0.5 to 10 hours. The temperature rising rate up to the heating temperature is, for example, 50 to 400° C./hour. In addition, as the heating atmosphere, it is possible to use air, oxygen, nitrogen, argon or a gas mixture thereof.

The inside of the heating device may be under an appropriate oxygen-containing atmosphere. The oxygen-containing atmosphere may be a gas mixture atmosphere of an inert gas and an oxidizing gas or may be in a state in which an oxidizing agent is present in an inert gas atmosphere. When the inside of the heating device is an appropriate oxygen-containing atmosphere, a transition metal that is contained in the metal composite hydroxide is appropriately oxidized, which makes it easy to control the form of the metal composite oxide.

As oxygen or the oxidizing agent in the oxygen-containing atmosphere, a sufficient number of oxygen atoms need to be present in order to oxidize the transition metal.

In a case where the oxygen-containing atmosphere is a gas mixture atmosphere of an inert gas and an oxidizing gas, the atmosphere in the reaction vessel can be controlled by a method in which an oxidizing gas is aerated into the heating device or the like.

As the oxidizing agent, it is possible to use a peroxide such as hydrogen peroxide, a peroxide salt such as permanganate, perchloric acid, hypochlorous acid, nitric acid, halogen, ozone, or the like.

MCC can be produced by the step described above.

(2) Mixing of MCC and Lithium Compound

The present step is a step of mixing a lithium compound and MCC to obtain a mixture.

The MCC is dried and then mixed with the lithium compound. After dried, the MCC may be appropriately classified.

As the lithium compound that is used in the present embodiment, it is possible to use at least any one of lithium carbonate, lithium nitrate, lithium acetate, lithium hydroxide, lithium oxide, lithium chloride, and lithium fluoride. Among these, any one of lithium hydroxide and lithium carbonate or a mixture thereof is preferable. In addition, in a case where lithium hydroxide contains lithium carbonate, the content of lithium carbonate in lithium hydroxide is preferably 5 mass % or less.

The lithium compound and MCC are mixed in consideration of the composition ratio of a final target product to obtain a mixture. Specifically, the lithium compound and MCC are mixed at ratios corresponding to the composition ratio of the composition formula (I) described above. The amount (mole ratio) of lithium atoms to the total amount 1 of the metal atoms contained in MCC is preferably 1.00 or more, more preferably 1.02 or more, and still more preferably 1.05 or more. The mixture of the lithium compound and MCC is calcined as described later, whereby a calcined product is obtained.

(3) Preliminary Calcining of Mixture

The mixture of MCC and the lithium compound are preliminary calcined. In the present embodiment, preliminary calcining is calcining at a temperature lower than the calcining temperature in a calcining step described below (when the calcining step has a plurality of calcining stages, the calcining temperature in the calcining stage that is conducted at the lowest temperature). As the calcining temperature during the preliminary calcining, for example, a range of 400° C. or higher and less than 700° C. is an exemplary example. The preliminary calcining may be conducted a plurality of times. Additionally, the holding time in the preliminary calcining is preferably 1 to 10 hours.

A calcining device to be used during the preliminary calcining is not particularly limited, and for example, either of a continuous calcining furnace or a fluidized calcining furnace may be used. As the continuous calcining furnace, a tunnel furnace or a roller hearth kiln is an exemplary example. As the fluidized calcining furnace, a rotary kiln may be used. When a fluidized calcining furnace is used, the calcining device shown in FIG. 1 described below may be used.

(4) Calcining of Mixture

The present step is a step of calcining a reaction product of a lithium compound and MCC obtained in the above-described preliminary calcining to obtain a calcined product (hereinafter, may be referred to as the calcining step). FIG. 1 is a schematic view describing an example of a calcining device that is used in the production method of LiMO in one aspect of the present embodiment.

The reaction product is calcined using a calcining device 400, which is a fluidized calcining furnace. In a fluidized calcining furnace, a substance to be calcined (in the present embodiment, a reaction product of MCC and the lithium compound) is not placed in a sheath box or the like, but substance to be calcined itself is injected into the calcining furnace. Therefore, it is possible to control the calcining rate without affected by the material of the sheath box and the like.

As the fluidized calcining furnace, a rotary kiln can be used. In the following description, as the calcining device 400, a rotary kiln is used, and the calcining device 400 is referred to as the "rotary kiln 400" and will be described.

In FIG. 1, the rotary kiln 400 is a device that heats a substance X1 to be calcined in a rotary cylinder 43. In other words, the rotary cylinder 43 is the calcining furnace, and the substance X1 to be calcined is calcined in the rotary cylinder 43. A supply port 41 for the substance X1 to be calcined is connected via piping 49 to one end side of the rotary cylinder 43. A discharge port 42 for the substance X1 to be calcined is connected to the other end side of the rotary cylinder 43.

The rotary cylinder 43 has a cylindrical shape having an axial center A and can rotate around the axial center. The rotary cylinder 43 is inclined, having the supply port 41 on its upper side and the discharge port 42 on its lower side. The inner wall of the rotary cylinder 43 is preferably of an alloy containing Ni, Fe, Cr, and the like.

The volume of the rotary cylinder 43 is, for example, 1 to 100 m³, preferably 2 to 99 m³, and more preferably 3 to 98 m³.

On the outer peripheral surface of the rotary cylinder 43, a heating section 44 is provided. A plurality of heating sections 44 may be provided.

Between the supply port 41 and the rotary cylinder 43, piping 45 and a dust collector 46 are provided. One end of the piping 45 is connected to the rotary cylinder 43, and the other end thereof is connected to the inlet of the dust collector 46. The dust collector 46 has an exhaust port 50 and a discharge port 47.

The substance X1 to be calcined injected from the supply port 41 is supplied to the rotary cylinder 43 by a supplying means such as a screw feeder in the piping 49. By means of the inclination of the rotary cylinder 43 and the rotation of the rotary cylinder 43, the substance X1 to be calcined is stirred while moving toward the discharge port 42. The substance X1 to be calcined is calcined in a region in which the heating section 44 is disposed (hereinafter, may be referred to as the heating region). The substance X1 to be calcined that has passed through the heating region is discharged as a calcined product from the discharge port 42.

In order to control the calcining atmosphere in the rotary cylinder 43, a gas G is introduced from a gas introducing port 48 provided in the vicinity of the discharge port 42 toward the dust collector 46. As the gas G, it is possible to select air, oxygen, nitrogen, argon, or a gas mixture thereof depending on a desired composition. When the gas G is introduced, a substance P to be calcined, which has a smaller particle diameter, in the substance X1 to be calcined in the rotary cylinder 43 is blown up and scattered in the rotary cylinder 43. The scattered substance P to be calcined is introduced into the piping 45 by a flow of the gas G to be introduced and an air flow generated by the dust collector 46. The substance P to be calcined introduced into the piping 45 is collected in the dust collector 46. The dust collector 46 exhausts through the exhaust port 50 as well as discharges the substance P to be calcined from the discharge port 47 to the supply port 41. As a result, the substance P to be calcined is injected again into the rotary cylinder 43.

In other words, the substance P to be calcined, which has a smaller particle diameter, in the substance X1 to be calcined may pass through the heating region a plurality of times. The calcined product obtained by passing through the heating region a plurality of times, because of subjected to the calcining step a plurality of times, will have a larger particle strength, in comparison with a particle having a particle diameter large enough not to be scattered, for example, a calcined product obtained by passing through the heating region only once. As a result, it is possible to simultaneously obtain the first particles, which have a particle diameter equal to or less than $D_{50}$ and $P_S$ and $\sigma_S$ within the ranges of the present embodiment, and the second particles, which have a particle diameter exceeding $D_{50}$ and $P_B$ and $\sigma_B$ within the ranges of the present embodiment.

In the present embodiment, an example in which the substance P to be calcined collected in the dust collector 46 is injected from the supply port 41 into the rotary cylinder 43 is described, but the present invention is not limited thereto. A configuration such that the substance P to be calcined collected in the dust collector 46 is merged with a substance X1 to be processed in a region between the supply port 41 and the piping 49, if in any form, can be applied to the present invention. For example, the discharge port 47 of the dust collector 46 may be connected to the piping 49.

The average linear velocity of the gas G to be introduced is preferably 0.001 to 1 m/sec and more preferably 0.005 to 0.9 m/sec. When the average linear velocity of the gas G to be introduced is 0.001 m/sec or more, the substance P to be calcined having a smaller particle diameter included in the substance X1 to be calcined, specifically, particles having a particle diameter equal to or less than $D_{50}$, are easily blown up and scattered in the rotary cylinder 43. When the average linear velocity of the gas G to be introduced is 1 m/sec or less, the entire substance X1 to be calcined is not scattered, and only the substance P to be calcined having a smaller particle diameter is easily scattered. It is possible to control $P_S$ and $\sigma_S$ of LiMO within the ranges of the present embodiment by appropriately adjusting the average linear velocity of the gas G to be introduced. When the average linear velocity of the gas G to be introduced is set to be high, there is a tendency that $P_S$ of LiMO increases and $\sigma_S$ thereof increases.

The average linear velocity of the gas G, which is a set value in introduction of the gas G into the rotary cylinder 43, can be calculated by the following formula (III).

Linear velocity [m/sec]=(gas flow rate [Nm³/h]/ 3600)/{π×(inner diameter of rotary cylinder)² [m²]×(100−filling rate of substance to be calcined in rotary cylinder [vol %])/100}=gas flow rate [m³/sec]/gas phase cross-sectional area [m²]                    (III)

As the calcining atmosphere in the rotary cylinder 43, air, oxygen, nitrogen, argon, a gas mixture thereof, or the like is used depending on a desired composition. In the present embodiment, the calcining atmosphere is preferably an oxygen-containing atmosphere. When the calcining atmosphere is an oxygen-containing atmosphere, the oxygen concentration in the calcining atmosphere is preferably 21 to 100 vol % and more preferably 25 to 100 vol %.

As the dust collector, a cyclonic dust collector, a gravity dust collector, or the like can be used. As the operating conditions for a cyclonic dust collector, the average linear velocity of the gas at the inlet of the cyclonic dust collector is 10 to 25 m/sec. It is possible to adjust the average linear velocity of the gas by appropriately selecting the diameter of the inlet of the cyclonic dust collector. As the operating conditions for a gravity dust collector, an average linear velocity of 1 to 2 m/sec of the gas in the settling chamber of the gravity dust collector is an exemplary example. When these operating conditions are specified as described above, the entire substance X1 to be calcined is not scattered, and only the substance P to be calcined having a smaller particle diameter is easily scattered and captured by the dust collector 46.

The calcining step may have a plurality of calcining stages that is carried out at different calcining temperatures. For example, a first calcining stage and a second calcining stage of calcining at a higher temperature than in the first calcining stage each may be independently conducted. Furthermore, the calcining step may have a calcining stage that is carried out at a different calcining temperature and for a different calcining time.

The calcining temperature in the present embodiment is 700° C. or higher, preferably 700 to 1100° C., and more preferably 720 to 1050° C. When the calcining temperature is 700° C. or higher, it is possible to obtain LiMO having a strong crystal structure. In addition, when the calcining temperature is 1100° C. or lower, it is possible to reduce the volatilization of lithium on the surfaces of the secondary particles that are contained in LiMO. It is possible to control $P_B$ and $\sigma_B$ of LiMO within the ranges of the present embodiment by appropriately adjusting the calcining temperature. When the calcining temperature is set to be high, there is a tendency that $P_B$ of the LiMO increases and $\sigma_B$ thereof decreases.

In the present specification, the calcining temperature means the temperature of the atmosphere in a calcining furnace and is the highest temperature of the holding temperatures in the calcining step (hereinafter, referred to as the highest holding temperature in some cases). In the case of a calcining step having a plurality of heating steps, the calcining temperature means the temperature in heating at the highest holding temperature among individual heating step. The upper limit value and lower limit value of the calcining temperature can be randomly combined together.

The holding time in the calcining is preferably 3 to 50 hours. When the holding time in the calcining is 3 hours or longer, crystals sufficiently develop, and the battery performance is improved. When the holding time in the calcining is 50 hours or shorter, the volatilization of lithium is unlikely to occur, and the battery performance is improved. It is possible to control $P_B$ and $\sigma_B$ of LiMO within the ranges of the present embodiment by appropriately adjusting the holding time in the calcining. When the holding time in the calcining is set to be long, there is a tendency that $P_B$ of LiMO increases and $\sigma_B$ thereof decreases.

In the present specification, the holding time in the calcining is defined as the time from when the substance to be calcined X is supplied from the supply port 41 until reaching the end of the region in which the heating section 44 is provided.

The rotational speed of the rotary cylinder 43 in the calcining step is preferably 0.025 to 5.0 rpm, more preferably 0.45 to 4.0 rpm, and still more preferably 0.7 to 3.0 rpm. When the rotational speed of the rotary cylinder 43 is 0.025 to 5.0 rpm, only the substance P to be calcined having a smaller particle diameter is easily scattered. it is possible to control $P_S$ and $\sigma_S$ of LiMO within the ranges of the present embodiment by appropriately adjusting rotational speed of the rotary cylinder 43 in the calcining step. When the rotational speed of the rotary cylinder 43 in the calcining step is set to be fast, there is a tendency that $P_S$ of LiMO increases and $\sigma_S$ thereof increases.

As described above, by appropriately adjusting the heating temperature, the average linear velocity of the gas to be introduced, the calcining temperature, the holding time in the calcining, and the rotational speed of the rotary cylinder

43 in the calcining step, it is possible to control $P_S$, $\sigma_S$, $P_B$, and $\sigma_B$ of LiMO within the ranges of the present embodiment.

The mixture of MCC and the lithium compound may be calcined in the presence of an inert melting agent. The inert melting agent may remain in the calcined product or may be removed by washing LiMO with a washing liquid or the like as described below. As the inert melting agent, one described in International Publication No. WO2019/177032 can be used.

When the reaction product of MCC and the lithium compound is calcined as described above, LiMO can be obtained.

(5) Other Steps

After the calcining step, the unreacted lithium compound and inert melting agent remaining may be removed by washing LiMO. For the washing, pure water or an alkaline washing liquid can be used. As the alkaline washing liquid, for example, aqueous solutions of one or more anhydrides selected from the group consisting of lithium hydroxide, sodium hydroxide, potassium hydroxide, lithium carbonate, sodium carbonate, potassium carbonate, and ammonium carbonate and a hydrate thereof can be exemplary examples. In addition, as the alkaline washing liquid, ammonia water can also be used.

The temperature of the washing liquid is preferably 15° C. or lower, more preferably 10° C. or lower, and still more preferably 8° C. or lower. When the temperature of the washing liquid is controlled within the above-described range to an extent that the washing liquid does not freeze, it is possible to suppress the excessive elution of lithium ions from the crystal structure of LiMO into the washing liquid during the washing.

As a method for bringing the washing liquid and LiMO into contact with each other, a method in which LiMO is injected into each washing liquid and stirred is an exemplary example. In addition, a method in which each washing liquid is sprayed to LiMO as a shower water may also be used. Furthermore, a method in which LiMO is injected into the washing liquid and stirred, then, LiMO is separated from each washing liquid, and then each washing liquid is sprayed to the separated LiMO as a shower water may also be used.

In the washing, it is preferable to bring the washing liquid and LiMO into contact with each other for an appropriate range of time. "Appropriate time" in the washing refers to a time long enough to disperse each particle of LiMO while removing the unreacted lithium compound and inert melting agent remaining on the surface of LiMO. The washing time is preferably adjusted depending on the aggregation state of LiMO. The washing time is particularly preferably, for example, in a range of 5 minutes to 1 hour.

The proportion of LiMO in a mixture of the washing liquid and LiMO (hereinafter, may be referred to as the slurry) is preferably 10 to 60 mass %, more preferably 20 to 50 mass %, and still more preferably more than 30 mass % and 50 mass % or less. When the proportion of LiMO is 10 to 60 mass %, it is possible to remove the unreacted lithium compound and inert melting agent.

After the washing of LiMO, it is preferable to carry out a heat treatment on LiMO. The temperature or method for carrying out the heat treatment is not particularly limited, but is preferably 100° C. or higher, more preferably 130° C. or higher, and still more preferably 150° C. or higher from the viewpoint that it is possible to prevent a decrease in the charge capacity. In addition, the temperature is not particularly limited, but is preferably 700° C. or lower and more preferably 600° C. or lower from the viewpoint that the volatilization of lithium can be prevented and LiMO having the composition of the present embodiment can be obtained.

The amount of lithium volatilized can be controlled by the heat treatment temperature.

The upper limit value and lower limit value of the heat treatment temperature can be randomly combined together. For example, the heat treatment temperature is preferably 100 to 700° C., more preferably 130 to 600° C., and still more preferably 150 to 600° C.

As the atmosphere during the heat treatment, an oxygen atmosphere, an inert atmosphere, a reduced pressure atmosphere, or a vacuum atmosphere is an exemplary example. When the heat treatment after the washing is carried out in the above-described atmosphere, a reaction between LiMO and moisture or carbon dioxide in the atmosphere during the heat treatment is suppressed, and LiMO containing a few impurities can be obtained.

The first production method of the present embodiment has been described as described above, but the present invention is not limited to this production method. Any production method, by which LiMO that contains first particles and second particles and in which $D_{50}$ is 2 to 20 m, $P_S$ is larger than $P_B$, and $\sigma_S$ is larger than $\sigma_B$ can be obtained, can be applied to the present invention.

For example, as a second production method of the present embodiment, there is a method for producing LiMO by mixing first particles and second particles each produced by a different method in order to control the particle strength and particle diameter. At this time, as the calcining furnace, a fluidized calcining furnace may be used, or a continuous calcining furnace such as a roller hearth kiln may be used.

For example, in "(4) Calcining of mixture" described in the first production method, the first particles are produced in the same manner as in the first production method except that calcining is conducted a plurality of times in a calcining furnace not comprising a dust collector. Additionally, in the above-described "(4) Calcining of mixture", the second particles are produced in a calcining furnace not comprising a dust collector in the same manner as in the first production method except that the number of times of the calcining in the above-described calcining step is less than that for the first particles, for example, the calcining is conducted once. When the obtained first particles and second particles are mixed, LiMO can be obtained.

<Positive Electrode Active Material for Lithium Secondary Battery>

CAM of the present embodiment contains LiMO produced by the method described above. In CAM of the present embodiment, the content proportion of LiMO in the total mass (100 mass %) of CAM is preferably 70 to 99 mass % and more preferably 80 to 98 mass %.

In the present embodiment, the content proportion of LiMO in the total mass of CAM is observed by irradiating CAM with an electron beam at an acceleration voltage of 20 kV using SEM (for example, JSM-5510 manufactured by JEOL Ltd.). The magnification of a SEM photograph is adjusted to a magnification at which 200 to 400 CAM particles, which are the subject, are present in the SEM photograph. As an example, the magnification may be 1000 to 30000 times.

<Lithium Secondary Battery>

Next, the configuration of a lithium secondary battery that is suitable in a case where LiMO of the present embodiment is used as CAM will be described.

Furthermore, a positive electrode for a lithium secondary battery that is suitable in a case where LiMO of the present embodiment is used as CAM (hereinafter, referred to as the positive electrode in some cases) will be described.

Furthermore, a lithium secondary battery that is suitable for an application of a positive electrode will be described.

An example of the lithium secondary battery that is suitable in a case where LiMO of the present embodiment is used as CAM has a positive electrode, a negative electrode, a separator interposed between the positive electrode and the negative electrode, and an electrolytic solution disposed between the positive electrode and the negative electrode.

An example of the lithium secondary battery has a positive electrode, a negative electrode, a separator interposed between the positive electrode and the negative electrode, and an electrolytic solution disposed between the positive electrode and the negative electrode.

Figure 2:
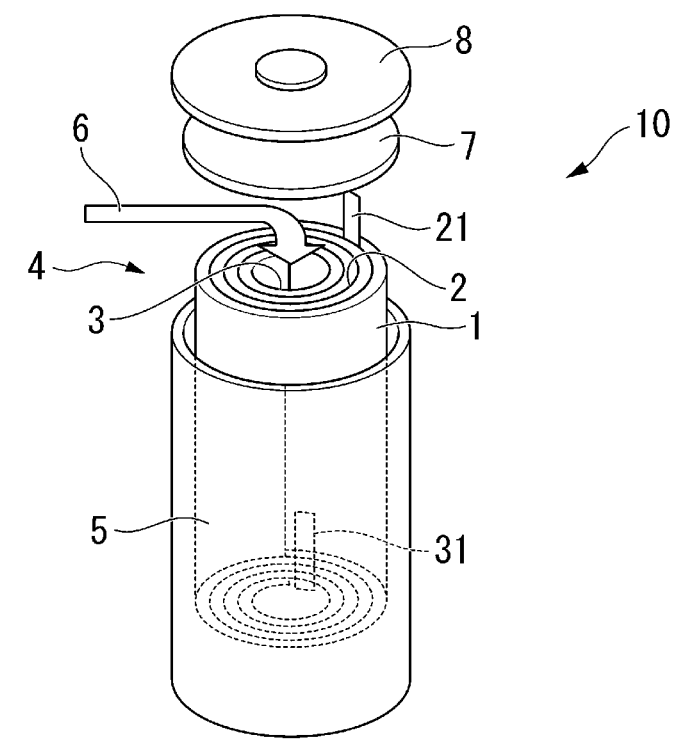
FIG. 2 is a schematic configuration view showing an example of a lithium secondary battery.

FIG. 2 is a schematic view showing an example of a lithium secondary battery. A cylindrical lithium secondary battery 10 of the present embodiment is produced as described below.

First, as shown in FIG. 2, a pair of separators 1 having a strip shape, a strip-shaped positive electrode 2 having a positive electrode lead 21 at one end, and a strip-shaped negative electrode 3 having a negative electrode lead 31 at one end are laminated in the order of the separator 1, the positive electrode 2, the separator 1, and the negative electrode 3 and are wound to form an electrode group 4.

Next, the electrode group 4 and an insulator, not shown, are accommodated in a battery can 5, and the can bottom is then sealed. The electrode group 4 is impregnated with an electrolytic solution 6, and an electrolyte is disposed between the positive electrode 2 and the negative electrode 3. Furthermore, the upper portion of the battery can 5 is sealed with a top insulator 7 and a sealing body 8, whereby the lithium secondary battery 10 can be produced.

As the shape of the electrode group 4, for example, a columnar shape in which the cross-sectional shape becomes a circle, an ellipse, a rectangle, or a rectangle with rounded corners when the electrode group 4 is cut in a direction perpendicular to the winding axis can be an exemplary example.

In addition, as a shape of the lithium secondary battery having the electrode group 4, a shape specified by IEC60086, which is a standard for a battery specified by the International Electrotechnical Commission (IEC), or by JIS C 8500 can be adopted. For example, shapes such as a cylindrical type and a square type can be exemplary examples.

Furthermore, the lithium secondary battery is not limited to the winding-type configuration and may have a laminate-type configuration in which the laminated structure of the positive electrode, the separator, the negative electrode, and the separator is repeatedly overlaid. As the laminate-type lithium secondary battery, a so-called coin-type battery, button-type battery, or paper-type (or sheet-type) battery can be an exemplary example.

Hereinafter, each configuration will be described in order.

(Positive Electrode)

The positive electrode can be produced by, first, preparing a positive electrode mixture containing CAM, a conductive material, and a binder and supporting the positive electrode mixture by a positive electrode current collector.

(Conductive Material)

As the conductive material in the positive electrode, a carbon material can be used. As the carbon material, graphite powder, carbon black (for example, acetylene black), a fibrous carbon material, and the like can be exemplary examples.

The proportion of the conductive material in the positive electrode mixture is preferably 5 to 20 parts by mass or less with respect to 100 parts by mass of CAM.

(Binder)

As the binder in the positive electrode, a thermoplastic resin can be used. As the thermoplastic resin, polyimide resins; fluororesins such as polyvinylidene fluoride (hereinafter, referred to as PVdF in some cases) and polytetrafluoroethylene; polyolefin resins such as polyethylene and polypropylene, and the resins described in WO 2019/098384A1 or US2020/0274158A1 can be exemplary examples.

(Positive Electrode Current Collector)

As the positive electrode current collector in the positive electrode, a strip-shaped member formed of a metal material such as Al, Ni, or stainless steel as a forming material can be used.

As a method for supporting the positive electrode mixture by the positive electrode current collector, a method in which a paste of the positive electrode mixture is prepared using an organic solvent, the paste of the positive electrode mixture to be obtained is applied to and dried on at least one surface side of the positive electrode current collector, and the positive electrode mixture is fixed by conducting an electrode pressing step.

As the organic solvent that can be used in a case where the paste of the positive electrode mixture is prepared, N-methyl-2-pyrrolidone (hereinafter, referred to as NMP in some cases) is an exemplary example.

As a method for applying the paste of the positive electrode mixture to the positive electrode current collector, for example, a slit die coating method, a screen coating method, a curtain coating method, a knife coating method, a gravure coating method, and an electrostatic spraying method are exemplary examples.

The positive electrode can be produced by the method described above.

(Negative Electrode)

The negative electrode in the lithium secondary battery needs to be a material which can be doped with lithium ions and from which lithium ions can be de-doped at a potential lower than that of the positive electrode, and an electrode in which a negative electrode mixture containing a negative electrode active material is supported by a negative electrode current collector and an electrode formed of a negative electrode active material alone can be exemplary examples.

(Negative Electrode Active Material)

As the negative electrode active material in the negative electrode, materials which are a carbon material, a chalcogen compound (oxide, sulfide, or the like), a nitride, a metal, or an alloy and which can be doped with lithium ions and from which lithium ions can be de-doped at a potential lower than that of the positive electrode are exemplary examples.

As the carbon material that can be used as the negative electrode active material, graphite such as natural graphite and artificial graphite, cokes, carbon black, a carbon fiber, and a calcined product of an organic polymer compound can be exemplary examples.

As oxides that can be used as the negative electrode active material, oxides of silicon represented by a formula $SiO_x$ (here, x is a positive real number) such as $SiO_2$ and SiO; oxides of tin represented by a formula $SnO_x$ (here, x is a positive real number) such as $SnO_2$ and SnO; and metal composite oxides containing lithium and titanium such as $Li_4Ti_5O_{12}$ can be exemplary examples.

In addition, as the metal that can be used as the negative electrode active material, lithium metal, silicon metal, tin metal, and the like can be exemplary examples. As a material that can be used as the negative electrode active material, the materials described in WO 2019/098384A1 or US2020/0274158A1 may be used.

These metals and alloys are used mainly singly as an electrode after being processed into, for example, a foil shape.

Among the above-described negative electrode active materials, the carbon material containing graphite such as natural graphite or artificial graphite as a main component is preferably used for the reason that the potential of the negative electrode rarely changes (the potential flatness is favorable) from an uncharged state to a fully-charged state during charging, the average discharging potential is low, the capacity retention rate at the time of repeatedly charging and discharging the lithium secondary battery is high (the cycle characteristics are favorable), and the like. The shape of the carbon material may be, for example, any of a flaky shape such as natural graphite, a spherical shape such as mesocarbon microbeads, a fibrous shape such as a graphitized carbon fiber, or an aggregate of fine powder.

The negative electrode mixture may contain a binder as necessary. As the binder, thermoplastic resins can be exemplary examples, and specifically, PVdF, thermoplastic polyimide, carboxymethylcellulose (hereinafter, referred to as CMC in some cases), styrene-butadiene rubber (hereinafter, referred to as SBR in some cases), polyethylene, and polypropylene can be exemplary examples.

(Negative Electrode Current Collector)

As the negative electrode current collector in the negative electrode, a strip-shaped member formed of a metal material such as Cu, Ni, or stainless steel as the forming material can be an exemplary example.

As a method for supporting the negative electrode mixture by the negative electrode current collector, similar to the case of the positive electrode, a method in which the negative electrode mixture is formed by pressurization and a method in which a paste of the negative electrode mixture is prepared using a solvent or the like, applied or dried on the negative electrode current collector, and then the negative electrode mixture is compressed by pressing are exemplary examples.

(Separator)

As the separator in the lithium secondary battery, it is possible to use, for example, a material that is made of a material such as a polyolefin resin such as polyethylene or polypropylene, a fluororesin, or a nitrogen-containing aromatic polymer and has a form such as a porous film, a non-woven fabric, or a woven fabric. In addition, the separator may be formed using two or more of these materials or the separator may be formed by laminating these materials. In addition, the separators described in JP-A-2000-030686 or US20090111025A1 may be used.

(Electrolytic Solution)

The electrolytic solution in the lithium secondary battery contains an electrolyte and an organic solvent.

As the electrolyte that is contained in the electrolytic solution, lithium salts such as $LiClO_4$, $LiPF_6$ and $LiBF_4$ are exemplary examples, and a mixture of two or more thereof may be used.

In addition, as the organic solvent that is contained in the electrolytic solution, for example, carbonates such as propylene carbonate, ethylene carbonate, dimethyl carbonate, diethyl carbonate, and ethyl methyl carbonate can be used.

As the organic solvent, two or more of these are preferably mixed and used. Among these, a solvent mixture containing a carbonate is preferable, and a solvent mixture of a cyclic carbonate and an acyclic carbonate and a solvent mixture of a cyclic carbonate and ethers are more preferable.

Furthermore, as the electrolytic solution, it is preferable to use an electrolytic solution containing a lithium salt containing fluorine such as $LiPF_6$ and an organic solvent having a fluorine substituent in order to enhance the safety of the obtained lithium secondary battery. As the electrolyte and organic solvent that are contained in the electrolytic solution, the electrolytes and organic solvents described in WO2019/098384A1 or US2020/0274158A1 may be used.

<All-Solid-State Lithium Secondary Battery>

Next, a positive electrode for which LiMO according to an aspect of the present invention is used as CAM of an all-solid-state lithium secondary battery and an all-solid-state lithium secondary battery having this positive electrode will be described while describing the configuration of an all-solid-state lithium secondary battery.

Figure 3:
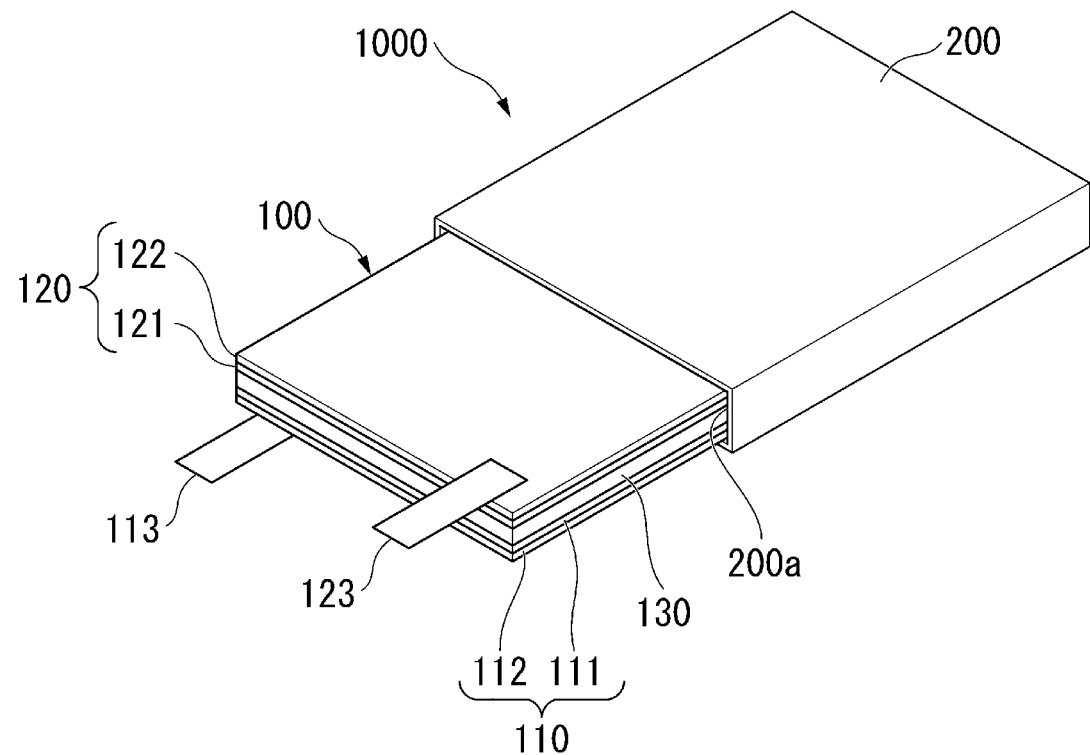
FIG. 3 is a schematic view showing an entire configuration of the all-solid-state lithium secondary battery of the present embodiment.

FIG. 3 is a schematic view showing an example of an all-solid-state lithium secondary battery of the present embodiment. An all-solid-state lithium secondary battery 1000 shown in FIG. 3 has a laminate 100 having a positive electrode 110, a negative electrode 120, and a solid electrolyte layer 130 and an exterior body 200 accommodating the laminate 100. In addition, the all-solid-state lithium secondary battery 1000 may have a bipolar structure in which CAM and a negative electrode active material are disposed on both sides of a current collector. As specific examples of the bipolar structure, for example, the structures described in JP-A-2004-95400 are exemplary examples. A material that configures each member will be described below.

The laminate 100 may have an external terminal 113 that is connected to a positive electrode current collector 112 and an external terminal 123 that is connected to a negative electrode current collector 122. In addition, the all-solid-state lithium secondary battery 1000 may have a separator between the positive electrode 110 and the negative electrode 120.

The all-solid-state lithium secondary battery 1000 further has an insulator, not shown, that insulates the laminate 100 and the exterior body 200 from each other and a sealant, not shown, that seals an opening portion 200a of the exterior body 200.

As the exterior body 200, a container formed of a highly corrosion-resistant metal material such as aluminum, stainless steel or nickel-plated steel can be used. In addition, as the exterior body 200, a container obtained by processing a laminate film having at least one surface on which a corrosion resistant process has been carried out into a bag shape can also be used.

As the shape of the all-solid-state lithium secondary battery 1000, for example, shapes such as a coin type, a button type, a paper type (or a sheet type), a cylindrical type, a square type, and a laminate type (pouch type) can be exemplary examples.

As an example of the all-solid-state lithium secondary battery 1000, a form in which one laminate 100 is provided is shown in the drawings, but the present embodiment is not limited thereto. The all-solid-state lithium secondary battery 1000 may have a configuration in which the laminate 100 is used as a unit cell and a plurality of unit cells (laminates 100) is sealed inside the exterior body 200.

Hereinafter, each configuration will be described in order.

(Positive Electrode)

The positive electrode 110 of the present embodiment has a positive electrode active material layer 111 and a positive electrode current collector 112.

The positive electrode active material layer 111 contains LiMO, which is one aspect of the present invention described above, and a solid electrolyte. In addition, the positive electrode active material layer 111 may contain a conductive material and a binder.

(Solid Electrolyte)

As the solid electrolyte that is contained in the positive electrode active material layer 111 of the present embodiment, a solid electrolyte that has lithium ion-conductive and is used in well-known all-solid-state lithium secondary batteries can be adopted. As such a solid electrolyte, an inorganic electrolyte and an organic electrolyte can be exemplary examples. As the inorganic electrolyte, an oxide-based solid electrolyte, a sulfide-based solid electrolyte, and a hydride-based solid electrolyte can be exemplary examples. As the organic electrolyte, polymer-based solid electrolytes can be exemplary examples. As each electrolyte, the compounds described in WO 2020/208872A1, US2016/0233510A1, US2012/0251871A1, and US2018/0159169A1 are exemplary examples, and examples thereof include the following compounds.

(Oxide-Based Solid Electrolyte)

As the oxide-based solid electrolyte, for example, a perovskite-type oxides, a NASICON-type oxide, a LISICON-type oxide, a garnet-type oxides, and the like are exemplary examples. Specific examples of each oxide include the compounds described in WO 2020/208872A1, US2016/0233510A1, and US2020/0259213A1, and, for example, the following compounds are exemplary examples.

As the garnet-type oxide, Li—La—Zr-based oxides such as $Li_7La_3Zr_2O_{12}$ (also referred to as LLZ) are exemplary examples.

The oxide-based solid electrolyte may be a crystalline material or an amorphous material.

(Sulfide-Based Solid Electrolyte)

As the sulfide-based solid electrolyte, $Li_2S—P_2S_5$-based compounds, $Li_2S—SiS_2$-based compounds, $Li_2S—GeS_2$-based compounds, $Li_2S—B_2S_3$-based compounds, $LiI—Si_2S—P_2S_5$-based compounds, $LiI—Li_2S—P_2O_5$-based compounds, $LiI—Li_3PO_4—P_2S_5$-based compounds, $Li_{10}GeP_2S_{12}$, and the like can be exemplary examples.

In the present specification, the expression "-based compound" that indicates the sulfide-based solid electrolyte is used as a general term for solid electrolytes mainly containing a raw material written before "-based compound" such as "$Li_2S$" or "$P_2S_5$". For example, the $Li_2S—P_2S_5$-based compounds include solid electrolytes mainly containing $Li_2S$ and $P_2S_5$ and further containing a different raw material. The proportion of $Li_2S$ that is contained in the $Li_2S—P_2S_5$-based compound is, for example, 50 to 90 mass % with respect to the entire $Li_2S—P_2S_5$-based compound. The proportion of $P_2S_5$ that is contained in the $Li_2S—P_2S_5$-based compound is, for example, 10 to 50 mass % with respect to the entire $Li_2S—P_2S_5$-based compound. In addition, the proportion of the different raw material that is contained in the $Li_2S—P_2S_5$-based compound is, for example, 0 to 30 mass % with respect to the entire $Li_2S—P_2S_5$-based compound. In addition, the $Li_2S—P_2S_5$-based compounds also include solid electrolytes containing $Li_2S$ and $P_2S_5$ in different mixing ratios.

As the $Li_2S—P_2S_5$-based compounds, $Li_2S—P_2S_5$, $Li_2S—P_2S_5—LiI$, $Li_2S—P_2S_5—LiCl$, $Li_2S—P_2S_5—LiBr$, $Li_2S—P_2S_5—LiI—LiBr$, and the like can be exemplary examples.

As the $Li_2S—SiS_2$-based compounds, $Li_2S—SiS_2$, $Li_2S—SiS_2—LiI$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—SiS_2—P_2S_5—LiCl$, and the like can be exemplary examples.

As the $Li_2S—GeS_2$-based compounds, $Li_2S—GeS_2$, $Li_2S—GeS_2—P_2S_5$, and the like can be exemplary examples.

The sulfide-based solid electrolyte may be a crystalline material or an amorphous material.

Two or more solid electrolytes can be jointly used as long as the effect of the invention is not impaired.

(Conductive Material and Binder)

As the conductive material that the positive electrode active material layer 111 has, the materials described in the above-described (Conductive material) can be used. In addition, as for the proportion of the conductive material in the positive electrode mixture, the proportions described in the above-described (Conductive material) can be applied in the same manner. In addition, as the binder that the positive electrode has, the materials described in the above-described (binder) can be used.

(Positive Electrode Current Collector)

As the positive electrode current collector 112 that the positive electrode 110 has, the materials described in the above-described (Positive electrode current collector) can be used.

As a method for supporting the positive electrode active material layer 111 by the positive electrode current collector 112, a method in which the positive electrode active material layer 111 is formed by pressurization on the positive electrode current collector 112 is an exemplary example. A cold press or a hot press can be used for the pressurization.

In addition, the positive electrode active material layer 111 may be supported by the positive electrode current collector 112 by preparing a paste of a mixture of CAM, the solid electrolyte, the conductive material, and the binder using an organic solvent to produce a positive electrode mixture, applying and drying the positive electrode mixture to be obtained on at least one surface of the positive electrode current collector 112, and fixing the positive electrode mixture by pressing.

In addition, the positive electrode active material layer 111 may be supported by the positive electrode current collector 112 by preparing a paste of a mixture of CAM, the solid electrolyte, and the conductive material using an organic solvent to produce a positive electrode mixture, applying and drying the positive electrode mixture to be obtained on at least one surface of the positive electrode current collector 112, and calcining the positive electrode mixture.

As the organic solvent that can be used for the positive electrode mixture, the same organic solvent as the organic solvent that can be used in the case of preparing the paste of the positive electrode mixture described in the above-described (Positive electrode current collector) can be used.

As a method for applying the positive electrode mixture to the positive electrode current collector 112, the methods described in the above-described section (Positive electrode current collector) are exemplary example.

The positive electrode 110 can be produced by the method described above. As a combination of specific materials to be used in the positive electrode 110, the combination described in Japanese Patent Application No. 2021-015685 is an exemplary example.

(Negative Electrode)

The negative electrode 120 has a negative electrode active material layer 121 and the negative electrode current collector 122. The negative electrode active material layer 121 contains a negative electrode active material. In addition, the negative electrode active material layer 121 may contain a solid electrolyte and a conductive material. As the negative electrode active material, the negative electrode current collector, the solid electrolyte, the conductive material, and a binder, those described above can be used.

As a method for supporting the negative electrode active material layer 121 by the negative electrode current collector 122, similar to the case of the positive electrode 110, a method in which the negative electrode active material layer 121 is formed by pressurization, a method in which a paste-form negative electrode mixture containing a negative electrode active material is applied and dried on the negative electrode current collector 122 and then the negative electrode active material layer 121 is compressed by pressing, and a method in which a paste-form negative electrode mixture containing a negative electrode active material is applied, dried and then calcined on the negative electrode current collector 122 are exemplary examples.
(Solid Electrolyte Layer)

The solid electrolyte layer 130 has the above-described solid electrolyte.

The solid electrolyte layer 130 can be formed by depositing a solid electrolyte of an inorganic substance on the surface of the positive electrode active material layer 111 in the above-described positive electrode 110 by a sputtering method.

In addition, the solid electrolyte layer 130 can be formed by applying and drying a paste-form mixture containing a solid electrolyte on the surface of the positive electrode active material layer 111 in the above-described positive electrode 110. The solid electrolyte layer 130 may be formed by pressing the dried paste-form mixture and further pressurizing the paste-form mixture by a cold isostatic pressure method (CIP).

The laminate 100 can be produced by laminating the negative electrode 120 on the solid electrolyte layer 130 provided on the positive electrode 110 as described above using a well-known method such that the negative electrode active material layer 121 comes into contact with the surface of the solid electrolyte layer 130.

In the lithium secondary battery having the above-described configuration, since LiMO that is produced by the present embodiment described above is used as CAM, it is possible to improve the cycle retention rate of a lithium secondary battery for which this CAM is used.

In addition, since positive electrodes having the above-described configuration have CAM having the above-described configuration, it is possible to improve the cycle retention rates of lithium secondary batteries.

Furthermore, the lithium secondary battery having the above-described configuration has the above-described positive electrode and thus becomes a secondary battery having a high cycle retention rate.

The present invention includes the following aspects, as another aspect.

[14] LiMO of particle shape, comprising first particles having a particle diameter equal to or less than a 50% cumulative volume particle size $D_{50}$ of the LiMO and second particles having a particle diameter exceeding the $D_{50}$, in which the $D_{50}$ is 2 to 20 μm, $P_S$–$P_B$, which is a difference between an average particle strength $P_S$ of the first particles and an average particle strength $P_B$ of the second particles is 17 to 70 MPa, a standard deviation $\sigma_S$ of the particle strength of the first particles is larger than a standard deviation $\sigma_B$ of the particle strength of the second particles.

[15] The LiMO according to [14], in which $\sigma_S$–$\sigma_B$, which is the difference between the $\sigma_S$ and the $\sigma_B$, is 7 to 70 MPa.

[16] The LiMO according to [14] or [15], in which the $P_S$ is 53 to 105 MPa.

[17] The LiMO according to any one of [14] to [16], in which the $P_B$ is 30 to 55 MPa.

[18] The LiMO according to any one of [14] to [17], in which the $\sigma_S$ is 25 to 85 MPa.

[19] The LiMO according to any one of [14] to [18], in which the $\sigma_B$ is 13 to 28 MPa.

[20] The LiMO according to any one of [14] to [19], in which the BET specific surface area is 1.0 to 1.5 m²/g.

[21] The LiMO according to any one of [14] to [20], in which the LiMO is represented by a composition formula (I)

$$Li[Li_x(Ni_{(1-y-z)}Co_yX_z)_{1-x}]O_2 \tag{I}$$

and in the formula (I), X represents one or more elements selected from the group consisting of Mn, Fe, Cu, Ti, Mg, Al, W, Mo, Nb, Zn, Sn, Zr, Ga, B, Si, S, and P, and $-0.1 \leq x \leq 0.2$, $0 \leq y \leq 0.4$, and $0 < z \leq 0.5$ are satisfied.

[22] The LiMO according to [21], in which the composition formula (I) satisfies $0 < y+z \leq 0.3$.

[23] CAM, containing: the LiMO according to any one of [14] to [22].

[24] A positive electrode for a lithium secondary battery, containing: the CAM according to [23].

[25] A lithium secondary battery, containing: the positive electrode for the lithium secondary battery according to [24].

EXAMPLES

Hereinafter, the present invention will be described in detail by showing examples, but the present invention is not limited to the following description.
<Composition Analysis>

The composition analysis of LiMO that was produced by a method to be described below was carried out, after dissolution of obtained LiMO in hydrochloric acid, using an inductively coupled plasma emission spectroscopic analyzer (SPS3000, manufactured by Seiko Instruments Inc.).
<$D_{50}$>

$D_{50}$ was measured using a powder of LiMO as a material to be measured by means of Microtrac MT3300EXII manufactured by MicrotracBEL Corp. as a laser diffraction scattering particle size distribution measuring device, by the method described in the above-described <Measuring method of cumulative particle size distribution>.
<Average Particle Strength and Standard Deviation of Particle Strength>

$P_S$, $P_B$, $\sigma_S$, and $\sigma_B$ were each calculated using MCT-510 manufactured by Shimadzu Corporation as a micro compression tester, by the method described in the above-described <Measuring method of average particle strength and standard deviation of particle strength>. $P_S$–$P_B$ and $\sigma_S$–$\sigma_B$ were calculated from the obtained values.
<Measurement of BET Specific Surface Area>

The BET specific surface area (unit: m²/g) was measured using a BET specific surface area meter (Macsorb (registered trademark) manufactured by Mountech Co., Ltd.) after drying 1 g of a powder of LiMO in a nitrogen atmosphere at 105° C. for 30 minutes.
<Identification Method of Crystal Structure>

The powder X-ray diffraction measurement was carried out with an X-ray diffraction instrument (Ultima IV manufactured by Rigaku Corporation). A powder of LiMO was filled into a dedicated substrate, and the measurement was carried out using a Cu-Kα ray source under conditions of a diffraction angle 2θ=10° to 90°, a sampling width of 0.02°, and a scan speed of 4°/min to obtain a powder X-ray diffraction pattern.

The crystal structure was identified from the powder X-ray diffraction pattern using integrated powder X-ray analysis software JADE.

<Production of Positive Electrode for Lithium Secondary Battery>

A paste-like positive electrode mixture was prepared by adding LiMO that was obtained by the production method to be described below, a conductive material (acetylene black), and a binder (PVdF), to achieve a composition of LiMO: conductive material:binder=92:5:3 (mass ratio) and carrying out kneading thereon. During the preparation of the positive electrode mixture, NMP was used as an organic solvent.

The obtained positive electrode mixture was applied to an Al foil having a thickness of 40 μm, which was to serve as a current collector and dried in a vacuum at 150° C. for 8 hours, thereby obtaining a positive electrode for a lithium secondary battery. The electrode area of the positive electrode for a lithium secondary battery was set to 1.65 cm$^2$.

<Production of Lithium Secondary Battery (Coin-Type Half Cell)>

The following operation was carried out in a glove box under an argon atmosphere.

The positive electrode for a lithium secondary battery produced in the section <Production of positive electrode for lithium secondary battery> was placed on the lower lid of a part for a coin-type battery R2032 (manufactured by Hohsen Corp.) with the aluminum foil surface facing downward, and a laminated film separator (a 16 μm-thick laminate having a heat-resistant porous layer laminated on a polyethylene porous film) was placed on the positive electrode. An electrolytic solution (300 μl) was poured thereinto. As the electrolytic solution, an electrolytic solution obtained by dissolving LiPF$_6$ in a liquid mixture of ethylene carbonate, dimethyl carbonate, and ethyl methyl carbonate in a volume ratio of 16:10:74 so as to be 1.3 mol/L and dissolving 1.0% of vinylene carbonate was used.

Next, lithium metal was used as a negative electrode, and the negative electrode was placed on the upper side of the laminated film separator. An upper lid was placed through a gasket and caulked using a caulking machine, thereby producing a lithium secondary battery (coin-type half cell R2032; hereinafter, referred to as "coin-type half cell" in some cases).

<Cycle Test>

The cycle retention rate of the coin-type half cell produced by the above-described method was calculated by the method described in the above-described <Cycle Test>.

Example 1

After water was poured into a reaction vessel equipped with a stirrer and an overflow pipe, an aqueous solution of sodium hydroxide was added thereto, and the liquid temperature was held at 50° C.

A nickel sulfate aqueous solution, a cobalt sulfate aqueous solution, and an aluminum sulfate aqueous solution were mixed together such that the mole ratio of Ni, Co, and Al reached 0.88:0.09:0.03, thereby preparing a raw material liquid mixture.

Next, the raw material liquid mixture and an ammonium sulfate aqueous solution, as a complexing agent, were continuously added into the reaction vessel under stirring. An aqueous solution of sodium hydroxide was timely added dropwise such that the pH of the solution in the reaction vessel reached 11.6 (measurement temperature: 40° C.), and a reaction precipitate 1 was obtained.

The reaction precipitate 1 was washed, then, dehydrated, dried, and sieved, and a metal composite hydroxide 1 containing Ni, Co and Al was obtained.

The metal composite hydroxide 1 was held and heated at 650° C. for 5 hours in the atmospheric atmosphere and cooled to room temperature, thereby obtaining a metal composite oxide 1.

Lithium hydroxide was weighed so that the amount (mole ratio) of Li with respect to the total amount 1 of Ni, Co, and Al that were contained in the metal composite oxide 1 reached 1.10. The metal composite oxide 1 and lithium hydroxide were mixed to obtain a mixture 1.

This mixture 1 was injected into a rotary kiln and held and heated at 690° C. for 2 hours in an oxygen atmosphere, thereby obtaining a reaction product 1 of the metal composite oxide 1 and lithium hydroxide.

Next, the obtained reaction product 1 was injected into a rotary kiln connected to a cyclonic dust collector and piping. At this time, a gas having an oxygen concentration of 100 vol % was introduced from the discharge port side toward the inlet side of the rotary kiln at an average linear velocity of 0.062 m/sec. As the operating conditions for the cyclonic dust collector, the average linear velocity of gas at the inlet of the cyclonic dust collector was set to 15 m/sec. The rotational speed of the rotary cylinder of the rotary kiln was 0.71 rpm. The temperature of the atmosphere in the calcining furnace was set to 770° C. and held for 2 hours, and the reaction product 1 was calcined to obtain a calcined product 1.

A slurry produced by mixing the calcined product 1 and pure water adjusted to a liquid temperature of 5° C. such that the mass proportion of the calcined product to the total amount of the slurry reached 30 mass % was stirred for 20 minutes, then dehydrated, and heat-treated at 250° C. The moisture remaining after the dehydration was dried to obtain LiMO (1).

The crystal structure of LiMO (1) was a layered rock-salt crystal structure. As a result of a compositional analysis of LiMO (1), in the composition formula (I), x=0.04, y=0.093, and z=0.024, and the element X was Al.

Example 2

LiMO (2) was obtained by the same procedure as in Example 1 except that the mass proportion of the calcined product 1 to the total amount of the slurry in the washing step was set to 40 mass %.

The crystal structure of LiMO (2) was a layered rock-salt crystal structure. As a result of a compositional analysis of LiMO (2), in the composition formula (I), x=0.05, y=0.095, and z=0.023, and the element X was Al.

Example 3

A calcined product 3 was obtained by the same procedure as in Example 1 except that an aqueous solution of sodium hydroxide was timely added dropwise such that the pH of the solution in the reaction vessel reached 11.5 (measurement temperature: 40° C.).

A slurry produced by mixing the calcined product 3 and pure water adjusted to a liquid temperature of 5° C. such that the mass proportion of the calcined product to the total amount of the slurry reached 40 mass % was stirred for 20 minutes, then dehydrated, and heat-treated at 250° C. The moisture remaining after the dehydration was dried to obtain LiMO (3).

The crystal structure of LiMO (3) was a layered rock-salt crystal structure. As a result of a compositional analysis of LiMO (3), in the composition formula (I), x=0.04, y=0.093, and z=0.022, and the element X was Al.

Comparative Example 1

The mixture 1 obtained in the process of Example 1 was used. This mixture 1 was injected into a rotary kiln and held and heated at 680° C. for 2 hours in an oxygen atmosphere, thereby obtaining a reaction product C1 of the metal composite oxide 1 and lithium hydroxide.

Next, the obtained reaction product C1 was injected into a rotary kiln. At this time, a gas having an oxygen concentration of 100 vol % was introduced from the discharge port side toward the inlet side of the rotary kiln at an average linear velocity of 0.036 m/sec. The rotational speed of the rotary cylinder of the rotary kiln was 1.22 rpm. The temperature of the atmosphere in the calcining furnace was set to 760° C. and held for 2 hours, and the reaction product C1 was calcined to obtain a calcined product C1.

A slurry produced by mixing the calcined product C1 and pure water adjusted to a liquid temperature of 5° C. such that the mass of the calcined product to the total amount of the slurry reached 40 mass % was stirred for 20 minutes, then dehydrated, and heat-treated at 250° C. The moisture remaining after the dehydration was dried to obtain LiMO (C1).

The crystal structure of LiMO (C1) was a layered rock-salt crystal structure. As a result of a compositional analysis of LiMO (C1), in the composition formula (I), x=0.04, y=0.092, and z=0.022, and the element X was Al.

Comparative Example 2

The mixture 1 obtained in the process of Example 1 was used. This mixture 1 was injected into a roller hearth kiln and held and heated at 650° C. for 5 hours in an oxygen atmosphere, thereby obtaining a reaction product C2.

Then, the obtained reaction product C2 was injected into a roller hearth kiln. At this time, a gas having an oxygen concentration of 100 vol % was introduced. The temperature of the atmosphere in the calcining furnace was set to 720° C. and held for 6 hours, and the reaction product C2 was calcined to obtain a calcined product C2.

A slurry produced by mixing the calcined product C2 and pure water adjusted to a liquid temperature of 5° C. such that the mass proportion of the calcined product to the total amount of the slurry reached 30 mass % was stirred for 20 minutes, then dehydrated, and heat-treated at 250° C. The moisture remaining after the dehydration was dried to obtain LiMO (C2).

The crystal structure of LiMO (C2) was a layered rock-salt crystal structure. As a result of a compositional analysis of LiMO (C2), in the composition formula (I), x=0.03, y=0.092, and z=0.027, and the element X was Al.

Example 4

After water was poured into a reaction vessel equipped with a stirrer and an overflow pipe, an aqueous solution of sodium hydroxide was added thereto, and the liquid temperature was held at 40° C.

A nickel sulfate aqueous solution, a cobalt sulfate aqueous solution, and an aluminum sulfate aqueous solution were mixed together such that the mole ratio of Ni, Co, and Al reached 0.91:0.07:0.02, thereby preparing a raw material liquid mixture.

Next, the raw material liquid mixture and an ammonium sulfate aqueous solution, as a complexing agent, were continuously added into the reaction vessel under stirring. An aqueous solution of sodium hydroxide was timely added dropwise such that the pH of the solution in the reaction vessel reached 12.1 (measurement temperature: 40° C.), and a reaction precipitate 4 was obtained.

The reaction precipitate 4 was washed, then, dehydrated, dried, and sieved, and a metal composite hydroxide 4 containing Ni, Co and Al was obtained.

The metal composite hydroxide 4 was held and heated at 650° C. for 5 hours in the atmospheric atmosphere and cooled to room temperature, thereby obtaining a metal composite oxide 4.

Lithium hydroxide was weighed so that the amount (mole ratio) of Li with respect to the total amount 1 of Ni, Co, and Al that were contained in the metal composite oxide 4 reached 1.10. The metal composite oxide 4 and lithium hydroxide were mixed to obtain a mixture 4.

This mixture 4 was injected into an oxidizing atmosphere calcining furnace (trade name: SKA-3050F-SP manufactured by MOTOYAMA CO., LTD.) and held and heated at 650° C. for 5 hours in an oxygen atmosphere, thereby obtaining a reaction product 4 of the metal composite oxide 4 and lithium hydroxide.

Next, the obtained reaction product 4 was injected to the oxidizing atmosphere calcining furnace. At this time, a gas having an oxygen concentration of 100 vol % was introduced. The temperature of the atmosphere in the calcining furnace was set to 720° C. and held for 5 hours, and a step of calcining the reaction product 4 was repeated twice to obtain a calcined product 4. The 50% cumulative volume particle size $D_{50}$ of the calcined product 4 was 9.7 μm.

A slurry produced by mixing the calcined product 4 and pure water adjusted to a liquid temperature of 5° C. such that the mass proportion of the calcined product to the total amount of the slurry reached 40 mass % was stirred for 20 minutes, then dehydrated, and heat-treated at 250° C. After the moisture remaining after the dehydration was dried, LiMO (4) was obtained by mixing such that the mass proportion to LiMO (C2) obtained in Comparative Example 2 reached 50 mass %.

The crystal structure of LiMO (4) was a layered rock-salt crystal structure. As a result of a compositional analysis of LiMO (4), in the composition formula (I), x=0.04, y=0.082, and z=0.028, and the element X was Al.

Comparative Example 3

The reaction product 4 obtained in the process of Example 4 was used. The obtained reaction product 4 was injected into an oxidizing atmosphere calcining furnace (trade name: SKA-3050-SP manufactured by MOTOYAMA CO., LTD.). At this time, a gas having an oxygen concentration of 100 vol % was introduced. The temperature of the atmosphere in the calcining furnace was set to 720° C. and held for 5 hours, and the reaction product 4 was calcined to obtain a calcined product C3.

A slurry produced by mixing the calcined product C3 and pure water adjusted to a liquid temperature of 5° C. such that the mass proportion of the calcined product to the total amount of the slurry reached 40 mass % was stirred for 20 minutes, then dehydrated, and heat-treated at 250° C. After the moisture remaining after the dehydration was dried, LiMO (C3) was obtained by mixing such that the mass proportion to LiMO (C2) obtained in Comparative Example 2 reached 50 mass %.

The crystal structure of LiMO (C3) was a layered rock-salt crystal structure. As a result of a compositional analysis of LiMO (C3), in the composition formula (I), x=0.03, y=0.081, and z=0.029, and the element X was Al.

The calcining devices and slurry concentrations in washing used in Example 1 to 3 and Comparative Example 1 to 2, $D_{50}$, $P_S$, $\sigma_S$, $P_B$, $\sigma_B$, $P_S$-$P_B$, $\sigma_S$-$\sigma_B$ of LiMOs (1) to (3) of Example 1 to 3 and LiMOs (C1) to (C2) of Comparative Examples 1 to 2, and the cycle retention rates of coin-type half cells for which each LiMO was used are shown in Table 1.

TABLE 1

| | Calcining device | Dust collector | Slurry concentration (mass %) | $D_{50}$ (μm) | First particles $P_S$ (MPa) | $\sigma_S$ (MPa) | Second particles $P_B$ (MPa) | $\sigma_B$ (MPa) | $P_S - P_B$ (MPa) | $\sigma_S - \sigma_B$ (MPa) | BET specific surface area ($m^2$/g) | 50-cycle retention rate (%) |
|---|---|---|---|---|---|---|---|---|---|---|---|---|
| Example 1 | Rotary kiln | Present | 30 | 13.1 | 69.1 | 44.3 | 49.7 | 17.6 | 19.4 | 26.7 | 1.50 | 88.7 |
| Example 2 | Rotary kiln | Present | 40 | 13.3 | 75.7 | 48.3 | 49.8 | 14.0 | 25.9 | 34.3 | 1.27 | 91.6 |
| Example 3 | Rotary kiln | Present | 40 | 15.0 | 53.8 | 20.3 | 37.3 | 13.0 | 16.5 | 7.3 | 1.07 | 89.3 |
| Comparative Example 1 | Rotary kiln | Absent | 40 | 12.4 | 53.3 | 13.1 | 43.1 | 14.0 | 10.2 | −0.9 | 1.01 | 79.6 |
| Comparative Example 2 | Roller hearth kiln | Absent | 30 | 12.2 | 36.2 | 15.5 | 39.7 | 13.9 | −3.5 | 1.6 | 1.38 | 83.3 |

In the calcining step of Examples 1 to 3, particles of the substance to be calcined having a smaller particle diameter that are scattered in the rotary cylinder are collected by the cyclonic dust collector and injected again into the rotary cylinder. The particles injected again into the rotary cylinder were calcined a plurality of times, and their particle strength increases. As shown in Table 1, $P_S$ became larger than $P_B$ and $\sigma_S$ became larger than $\sigma_B$ of Example 1 to 3. $P_S$–$P_B$ was 15 MPa or more, and $\sigma_S$–$\sigma_B$ was 5 MPa or more. The cycle retention rates of coin-type half cells for which such LiMO was used were 88.7% or more.

In contrast, as shown in Comparative Examples 1 to 2, in the case where the calcining device has no cyclonic dust collector and the substance to be calcined that is scattered is not collected and injected again, the values of the cycle retention rate became lower in comparison with Examples 1 to 3.

Figure 4:
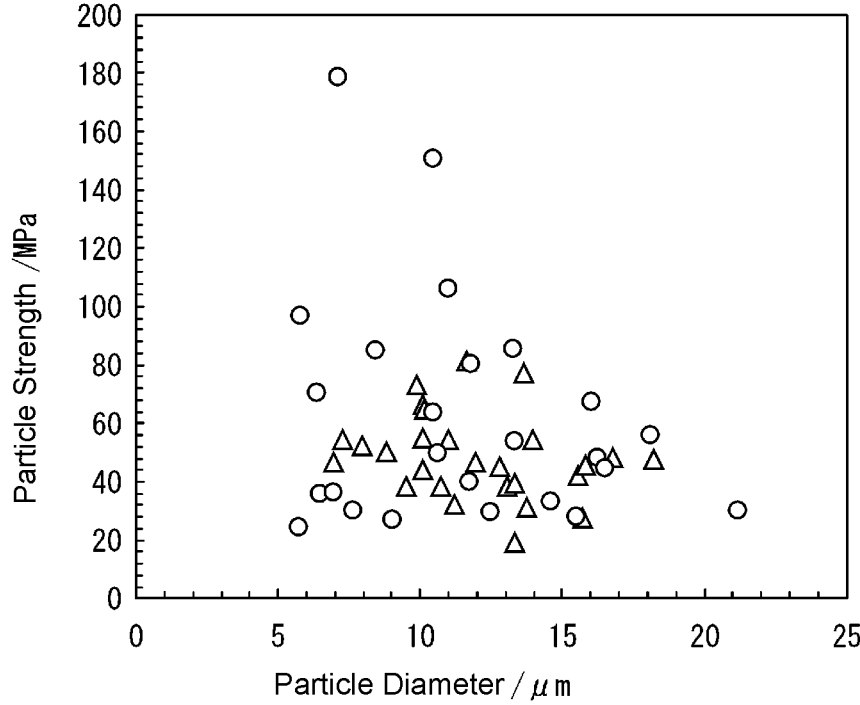
FIG. 4 is a graph showing the relationship between the particle diameter and the particle strength of the lithium metal composite oxides of Example 1 and Comparative Example 1.

FIG. 4 is a graph showing the relationship between the particle diameter and the particle strength of LiMOs of Example 1 and Comparative Example 1. Circles indicate the result of LiMO of Example 1. Triangles indicate the result of LiMO of Comparative Example 1. In LiMO of Example 1, particles of $D_{50}$ (13.1 μm) or smaller tended to have a large maximum particle strength, and as the particle diameter became larger, the variations in the particle strength tended to be smaller. From this result, it is considered that at least some of the particles of $D_{50}$ or smaller were calcined a plurality of times and thus the particle strength increased.

LiMO of Comparative Example 1 showed no tendency that the particle strength differs depending on the particle diameter.

The calcining devices and slurry concentrations in washing used in Example 4 and Comparative Example 3, $D_{50}$, $P_S$, $\sigma_S$, $P_B$, $\sigma_B$, $P_S$–$P_B$, and $\sigma_S$–$\sigma_B$ of LiMO (4) of Example 4 and LiMO (C3) of Comparative Example 3, and the cycle retention rates of coin-type half cells for which each LiMO was used are shown in Table 2.

TABLE 2

| | First particle calcining device | Number of times of calcining first particles Preliminary calcining | Calcining | Second particle calcining device | Number of times of calcining second particles Preliminary calcining | Calcining | $D_{50}$ (μm) | First particles $P_S$ (MPa) | $\sigma_S$ (MPa) |
|---|---|---|---|---|---|---|---|---|---|
| Example 4 | Oxidizing atmosphere calcining furnace | once | twice | Roller hearth kiln | once | once | 11.0 | 105.0 | 82.6 |
| Comparative Example 3 | Oxidizing atmosphere calcining furnace | once | once | Roller hearth kiln | once | once | 10.8 | 37.0 | 18.8 |

| | | Second particles $P_B$ (MPa) | $\sigma_B$ (MPa) | $P_S - P_B$ (MPa) | $\sigma_S - \sigma_B$ (MPa) | BET specific surface area ($m^2$/g) | 50-cycle retention rate (%) |
|---|---|---|---|---|---|---|---|
| Example 4 | Oxidizing atmosphere calcining furnace | 39.9 | 13.9 | 65.1 | 68.7 | 1.21 | 84.2 |
| Comparative Example 3 | Oxidizing atmosphere calcining furnace | 39.9 | 13.9 | −2.9 | 4.9 | 1.36 | 79.9 |

LiMO of Example 4 is a mixture of first particles subjected to the calcining step twice and second particles subjected to the calcining step once. In such LiMO, $P_S$ became larger than $P_B$, and $\sigma_S$ became larger than $\sigma_B$. $P_S-P_B$ was 15 MPa or more, and $\sigma_S-\sigma_B$ was 5 MPa or more. The cycle retention rate of the coin-type half cell for which LiMO of Example 4 was used was 84.2%.

LiMO pf Comparative Example 3 is a mixture of particles each subjected to the calcining step once. In such LiMO, $P_S$ was smaller than $P_B$. The cycle retention rate of the coin-type half cell for which LiMO of Comparative Example 3 was used was 79.9%.

INDUSTRIAL APPLICABILITY

According to the present invention, it is possible to provide a lithium metal composite oxide, when used as CAM, capable of obtaining a lithium secondary battery having a high cycle retention rate, CAM, a positive electrode for a lithium secondary battery, and a lithium secondary battery in which the lithium metal composite oxide is used.

REFERENCE SIGNS LIST

1: Separator, 2: Positive electrode, 3: Negative electrode, 4: Electrode group, 5: Battery can, 6: Electrolytic solution, 7: Top insulator, 8: Sealing body, 10: Lithium secondary battery, 21: Positive electrode lead, 31: Negative electrode lead, 400: Calcining device, 41: Supply port, 42: Discharge port, 43: Rotary cylinder, 44: Heating section, 45, 49, 50: Piping, 46: Dust collector, 47: Discharge port, 48: Gas introducing port, 100: Laminate, 110: Positive electrode, 111: Positive electrode active material layer, 112: Positive electrode current collector, 113: External terminal, 120: Negative electrode, 121: Negative electrode active material layer, 122: Negative electrode current collector, 123: External terminal, 130: Solid electrolyte layer, 200: Exterior body, 200a: Opening portion, 1000: All-solid-state lithium secondary battery.

The invention claimed is:

1. A lithium metal composite oxide of particle shape, comprising first particles having a particle diameter equal to or less than a 50% cumulative volume particle size $D_{50}$ of the lithium metal composite oxide and second particles having a particle diameter exceeding the $D_{50}$,
wherein the $D_{50}$ is 2 to 20 μm,
an average particle strength $P_S$ of the first particles is larger than an average particle strength $P_B$ of the second particles, and a standard deviation $\sigma_S$ of the particle strength of the first particles is larger than a standard deviation $\sigma_B$ of the particle strength of the second particles.

2. The lithium metal composite oxide according to claim 1,
wherein $P_S-P_B$, which is a difference between the $P_S$ and the $P_B$, is 15 MPa or more.

3. The lithium metal composite oxide according to claim 1,
wherein $\sigma_S-\sigma_B$, which is a difference between the $\sigma_S$ and the $\sigma_B$, is 5 MPa or more.

4. The lithium metal composite oxide according to claim 1,
wherein the $P_S$ is 50 to 110 MPa.

5. The lithium metal composite oxide according to claim 1,
wherein the $P_B$ is 20 to 60 MPa.

6. The lithium metal composite oxide according to claim 1,
wherein the $\sigma_S$ is 20 to 90 MPa.

7. The lithium metal composite oxide according to claim 1,
wherein the $\sigma_B$ is 10 to 30 MPa.

8. The lithium metal composite oxide according to claim 1,
wherein a BET specific surface area is 0.1 to 2.0 m²/g.

9. The lithium metal composite oxide according to claim 1,
wherein the lithium metal composite oxide is represented by a composition formula (I)

$$Li[Li_x(Ni_{(1-y-z)}Co_yX_z)_{1-x}]O_2 \qquad (I),$$

and in the formula (I), X represents one or more elements selected from the group consisting of Mn, Fe, Cu, Ti, Mg, Al, W, Mo, Nb, Zn, Sn, Zr, Ga, B, Si, S, and P, and $-0.1 \leq x \leq 0.2$, $0 \leq y \leq 0.4$, and $0 < z \leq 0.5$ are satisfied.

10. The lithium metal composite oxide according to claim 9,
wherein the composition formula (I) satisfies $0 < y+z \leq 0.3$.

11. A positive electrode active material for a lithium secondary battery, comprising:
the lithium metal composite oxide according to claim 1.

12. A positive electrode for a lithium secondary battery, comprising:
the positive electrode active material for the lithium secondary battery according to claim 11.

13. A lithium secondary battery, comprising:
the positive electrode for the lithium secondary battery according to claim 12.

* * * * *